United States Patent
Yu et al.

(10) Patent No.: US 10,084,959 B1
(45) Date of Patent: Sep. 25, 2018

(54) COLOR ADJUSTMENT OF STITCHED PANORAMIC VIDEO

(71) Applicant: Amazon Technologies, Inc., Seattle, WA (US)

(72) Inventors: Tsz Ho Yu, Sunnyvale, CA (US); Jim Oommen Thomas, Seattle, WA (US); Cheng-Hao Kuo, Seattle, WA (US); Yinfei Yang, Bellevue, WA (US); Ross David Roessler, Seattle, WA (US); Paul Aksenti Savastinuk, Shoreline, WA (US); William Evan Welbourne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 14/750,975

(22) Filed: Jun. 25, 2015

(51) Int. Cl.
*H04N 7/00* (2011.01)
*H04N 5/232* (2006.01)
*H04N 9/64* (2006.01)
*H04N 5/265* (2006.01)
*H04N 9/09* (2006.01)

(52) U.S. Cl.
CPC ......... *H04N 5/23238* (2013.01); *H04N 5/265* (2013.01); *H04N 9/09* (2013.01); *H04N 9/643* (2013.01)

(58) Field of Classification Search
CPC ....... H04N 5/23238; H04N 9/09; H04N 5/232
USPC .......................................................... 348/36
See application file for complete search history.

(56) References Cited

U.S. PATENT DOCUMENTS

| 6,035,060 A * | 3/2000 | Chen | H04N 9/75 348/E9.056 |
| 2007/0036456 A1* | 2/2007 | Hooper | G06T 5/20 382/274 |
| 2007/0279494 A1* | 12/2007 | Aman | G01S 3/7864 348/169 |

(Continued)

OTHER PUBLICATIONS

"Meet the V.360," VSN Mobil, retrieved from <<https://www.vsnmobil.com/products/v360>> on Jun. 19, 2015, 1 page.

(Continued)

*Primary Examiner* — Jamie Atala
*Assistant Examiner* — Masum Billah
(74) *Attorney, Agent, or Firm* — Lee & Hayes, PLLC

(57) ABSTRACT

A video capture device may include multiple cameras that simultaneously capture video data. The video capture device and/or one or more remote computing resources may stitch the video data captured by the multiple cameras to generate stitched video data that corresponds to 360° video. The remote computing resources may apply one or more algorithms to the stitched video data to adjust the color characteristics of the stitched video data, such as lighting, exposure, white balance contrast, and saturation. The remote computing resources may further smooth the transition between the video data captured by the multiple cameras to reduce artifacts such as abrupt changes in color as a result of the individual cameras of the video capture device having different video capture settings. The video capture device and/or the remote computing resources may generate a panoramic video that may include up to a 360° field of view.

20 Claims, 7 Drawing Sheets

(56) References Cited

U.S. PATENT DOCUMENTS

2010/0014780 A1* 1/2010 Kalayeh .................. G06T 1/00
                                                    382/284
2015/0055929 A1    2/2015 Van Hoff et al.
2016/0295108 A1* 10/2016 Cao .................. H04N 5/23238

OTHER PUBLICATIONS

Office Action for U.S. Appl. No. 14/751,024, dated Oct. 3, 2017, Thomas, "Remote Immersive User Experience from Panoramic Video", 30 pages.

* cited by examiner

COLOR ADJUSTMENT OF STITCHED PANORAMIC VIDEO

BACKGROUND

Panoramic video may be generated by stitching together video data captured by multiple cameras of a video capture device. However, there are several camera imaging settings unique to each camera that affect the video data when a video is captured, such as exposure time, color temperature, and sensor sensitivity, among others. Accordingly, video captured by different cameras having different settings may cause the resulting panoramic video to be of poor quality, which may result in a user being displeased with the panoramic video, which may then result in a poor user experience. This leads to the possibility of new technology enabling novel systems and techniques for generating panoramic video from a video capture device that provides better quality video and a better user experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
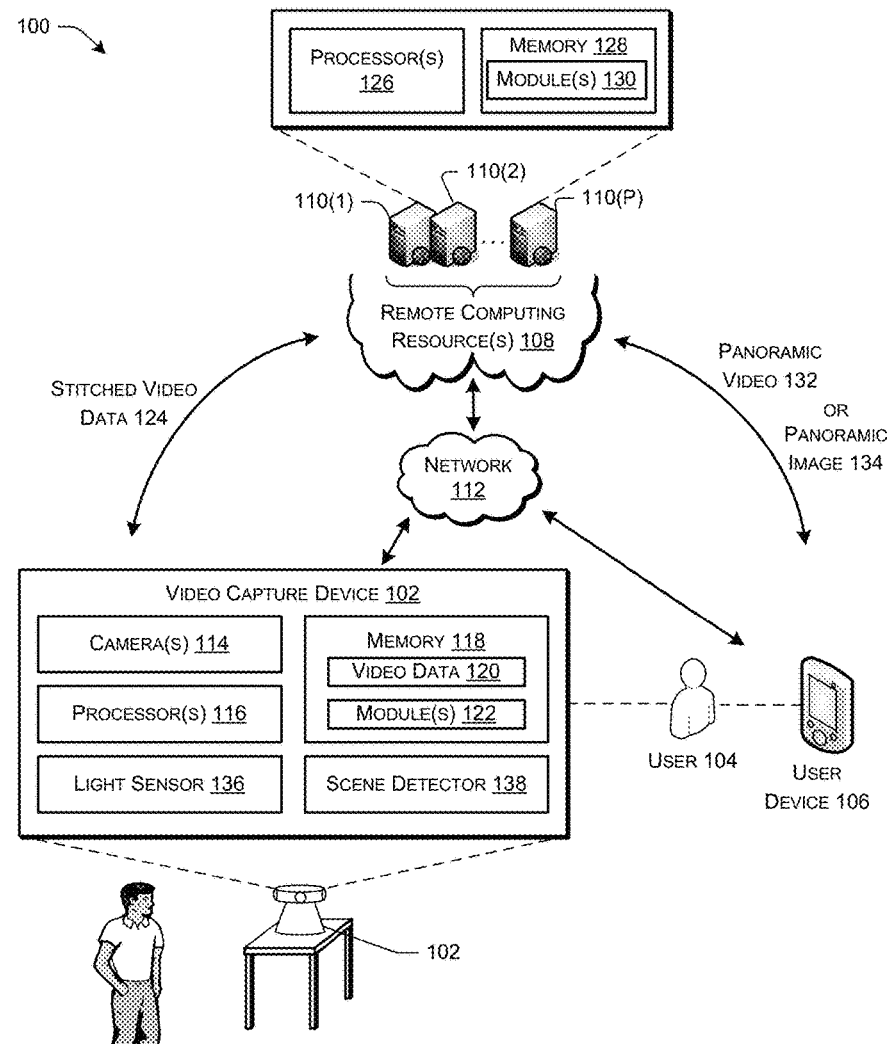
FIG. 1 illustrates an example system for generating a panoramic video based on adjusting the color of video data captured by multiple cameras of a video capture device.

There are several video capture settings that are determined and utilized when a video is captured by a camera, such as exposure time, sensor sensitivity, and white balance among others. In many video capture systems, including those that may rely on multiple cameras for generating panoramic images, these video capture settings are typically determined automatically and independently by each camera. Consequently, panoramic video captured using multiple cameras of a video capture device whose video data is subsequently stitched together may be uneven, and may exhibit artifacts or noise at the boundary between individual frames of the video data captured by the multiple cameras, and may exhibit abrupt color changes between frames of video data captured by different cameras of a video capture device that are stitched together.

Accordingly, the systems and/or processes described herein may generate a panoramic video from video data captured by one or more cameras of a video capture device. More particularly, the systems and/or processes described herein may correspond to a video capture device having multiple cameras (e.g., four cameras) that each simultaneously capture video data of the surrounding environment. As a result, each of the multiple cameras of the video capture device described herein may simultaneously capture video data corresponding to multiple, different fields of view. Accordingly, provided that the video capture device included four or more different cameras that each capture video data, the video capture device may be configured to capture up to a 360° video and/or a 360° image, or any desired field of view less than 360°. A video capture device may capture panoramic images and/or video through a single camera. For example, a single camera may have a very wide angle field of view, it may be rotated to change its field of view during capture, or it may capture the scene through another object, such as reflective mirrors or light bending devices, such as prisms or fiber optics, that direct light into the camera from up to 360° to result in a panoramic image.

When a device having multiple cameras is used to capture video data, the video capture device and/or one or more remote computing resources (e.g., a server device) may stitch together the video data. That is, provided that four cameras simultaneously captured four streams of video data, the video data may be stitched together to generate a 360° video that represents the environment surrounding the video capture device. The systems and/or processes described herein may apply one or more algorithms to the stitched video data in order to determine candidate frames of the stitched video data that are most likely of interest to a user associated with the video capture device. The algorithms may seek to identify persons, objects, scenes (e.g., a beach, mountains, etc.), etc., that are likely to be of interest to the user. One of the candidate frames may then be analyzed to determine the most likely desired scene of interest (e.g., the likely primary subject of the video) and the algorithms specific for that scene may be selected and applied to the video data to adjust the color, lighting, contrast, etc., and/or properly adjust the exposure for that scene. Thus, the candidate frame, which likely contains the primary subject of the video, is used to select the adjustments that will result in a panoramic video in which the primary subject is presented in an aesthetically pleasing manner.

Alternatively, the system and/or processes described herein may analyze a frame from each of the multiple cameras, and adjust the video data from each camera of the video capture device independently. In other words, image data, also referred to as frames of video data, may be analyzed and subsequent frames of video data may be adjusted based on the analysis of the image data. As use herein, the term image data refers to a still image. The image data may be captured as a single image, such as a photograph, or may be a single frame of video data. When image data is captured relatively quickly, such as thirty frames per second for example, and assembled in sequential order, it combines to create video data.

Frames from one camera may then be compared with frames from another camera captured at the same time and the video data from each camera may be blended to correct artifacts occurring at the boundary between adjacent video frames. For example, one camera may be pointed generally in the direction of the evening sun and set to expose for a sunset while an adjacent camera may be set to a portraiture exposure as it captures video of a person side lit by the sunset. In this example, each camera will likely have very different video capture settings. When the raw video data from each camera is stitched together, there may be artifacts at the boundary between the video data captured by each camera, such as abrupt changes in the color of the sky. The systems and/or processes described herein may apply one or more algorithms to the video data to smooth the transition between the stitched frames of video data captured by adjacent cameras. Additionally, upon determining that the horizon of the video data is not level, the algorithms may manipulate the frames of video data such that the horizon depicted in the frames of video data is level, and then apply additional algorithms to blend the video data captured by the multiple cameras of the video capture device.

FIG. 1 illustrates an example system 100 that is configured to generate panoramic video 132 from video data 120 captured from multiple cameras 114 of a video capture device 102 (interchangeably referred to as "device"). The video capture device 102 may be included in an environment, such as a home environment, as illustrated in FIG. 1, or in any other environment (e.g., an outdoors environment). The video capture device 102 may be placed in a fixed location within the environment, such as on a table, on a mount or stand, or may be carried by a user 104. In various embodiments, the user 104 may have one or more other user devices 106, which may be used to perform various operations. Here, the user device 106 may be utilized by the user 104 to receive panoramic video 132 and/or panoramic images 134 generated by the system 100. In addition to the video capture device 102, the system 100 may include one or more remote computing resource(s) 108, which may be implemented as one or more servers 110(1), 110(2), . . . , 110(P), and one or more networks 112.

As illustrated in FIG. 1, the video-capture device 102 may include at least one or more cameras 114, one or more processors 116, and memory 118. The memory 118 may store video data 120 captured by the cameras 114 and one or more modules 122 that perform various operations. In various embodiments, each of the cameras 114 of the video capture device 102 may capture video data 120, such as a stream of video, as well as still images. As used herein, a video stream is video data 120 captured from a single camera 114 of the video capture device 102. Multiple video streams may be stitched together to create stitched video data 124 and a panoramic video 132. For instance, provided that the video-capture device 102 included four different cameras 114, each of the four cameras 114 may capture a different video stream corresponding to a field of view. The four cameras 114 may be positioned equally around the video capture device 102, such that each camera 114 is positioned 90°, or approximately 90°, with respect to adjacent cameras 114 (e.g., cameras 114 to the left and the right). That is, a first axis in which a first camera 114 is oriented may be approximately 90° from a second axis in which adjacent cameras 114 are oriented. Since the field of view of a first camera 114 may overlap with the field of views of adjacent cameras 114, the multiple cameras 114 of the video capture device 102 may capture 360° of video data, which will be discussed in additional detail with respect to FIG. 2. Moreover, instead of the video capture device 102 including multiple cameras 114, the video capture device 102 may capture 360° video using a single camera 114 that rotates about the video capture device 102 at a high rate/speed. Alternatively, a panoramic image may be created by one or more cameras that rotate to capture an image that displays a field of view that is larger than the field of view of the camera when stationary.

The cameras 114 of the video capture device 102 may capture video data 120 of the environment surrounding the video capture device 102. The video capture device 102 may be set on a surface within an environment, which may allow the multiple cameras 114 to capture video of the environment. For instance, the video capture device 102 may be set on a table within a room of a home to capture video of activity (e.g., a birthday party) taking place within the room. Due to multiple cameras 114 simultaneously capturing video, the video capture device 102 may capture video data 120 in multiple different directions, thereby capturing video data 120 of an entirety of the events taking place within the room, provided that those events are within the field of view of at least one of the cameras 114. The video capture device 102 may also be held by the user 104, or may be affixed to the user 104 in some manner (e.g., via a strap, a clip, a platform, etc.). Accordingly, as the user 104 moves within an environment (e.g., a room, the beach, a hike in the mountains, etc.), the video capture device 102 may capture video data 120 of events occurring within that environment. The cameras 114 may continuously capture video data 120, or may begin/cease capturing video data 120 in response to user input (e.g., actuating a button, a voice command, etc.).

As stated above, the video data 120 may represent video captured by each of the multiple cameras 114 of the video capture device 102. The one or more modules 122 of the video capture device 102 may include software and/or other functionality that may stitch together the video data 120 captured by the multiple cameras 114. That is, provided that the video data 120 is captured by four different cameras 114, the modules 122 may stitch video data 120 captured by a first camera 114 with the video data 120 captured by cameras 114 adjacent to the first video camera 114. As a result, stitching of the video data 120 may result in stitched video data 124, where the stitched video data 124 is 360° video that depicts the environment surrounding the video capture device 102. The stitching of the video data 120 may also be performed by the remote computing resources 108, or by a combination of the video capture device 102 and the remote computing resources 108, and is discussed in additional detail with respect to FIG. 2.

In other embodiments, the modules 122 may include speech recognition software or other speech recognition functionality. The video capture device 102 may include one or more microphones that detect voice commands uttered by the user 104 and that generate one or more audio signals corresponding to the voice commands. The speech recognition software may process the audio signals to recognize words included within the voice command. As a result, the video capture device 102 may recognize voice commands uttered by the user 104 (e.g., start recording video, stop recording video, take a photograph, etc.) and perform corresponding operations as a result (e.g., instruct the cameras 114 to record video, instruct the cameras 114 to cease recording video, instruct the cameras 114 to capture a still image, etc.). The video capture device 102 may include one or more user interfaces (e.g., graphical user interfaces) and/or one or more speakers that allow the video capture device to visually and/or audibly output information to the user 104, which may allow the user 104 to interact with the video capture device 102.

The video capture device 102 may further include a light sensor 136, which may also be referred to as a light meter, that can detect the ambient lighting conditions present in the environment and provide exposure information to the cameras 114, where the exposure information can be used to establish the video capture settings of the cameras 114. For example, in an environment with little available light, the light sensor 136 can provide information to the camera 114 to allow the camera 114 to properly expose for the ambient conditions.

Additionally, the video capture device 102 may include a scene detector 138. The scene detector 138 may be configured to analyze the scene within a field of view of one or more of the cameras 114 of the video capture device 102 and adjust the video capture settings of the cameras 114 to properly capture the scene. For example, when capturing video of a skier against a snowy backdrop, the contrast may need to be adjusted to properly capture the details in the snow covered mountain along with the details of the skier. Once a scene is detected, the video capture settings of the camera 114 can be adjusted to provide an aesthetically pleasing video. Moreover, by adjusting the video capture settings of the camera 114 to more naturally capture the scene, less digital processing is required on the captured video data 120, which results in a more efficient process and fewer artifacts that show up in the resulting panoramic video 132. The scene detector 138 may be implemented automatically in the video capture device 102, may be a manual setting within the video capture device 102 that a user 104 can specify, or may be implemented within the remote computing resources 108.

In some instances, the video capture device 102 may operate in conjunction with or may otherwise utilize computing resources that are remote from the video capture device 102 (i.e., the remote computing resources 108). For instance, the video capture device 102 may couple to the remote computing resources 108 over a network 112. As illustrated, and as set forth above, the remote computing resources 108 may be implemented as one or more servers 110(1), 110(2), . . . , 110(P) and may, in some instances, form a portion of a network-accessible computing platform implemented as a computing infrastructure of processors 126, storage (e.g., memory 128), software (e.g., modules 130), data access, and so forth that is maintained and accessible via the network 112, such as the Internet. The remote computing resources 108 may not require end-user knowledge of the physical location and configuration of the system that delivers the services. Common expressions associated for these remote computing resources 108 may include "on-demand computing", "software as a service (SaaS)", "platform computing", "network-accessible platform", "cloud services", "data centers", and so forth.

The servers 110(1)-(P) may include the processor 126 and the memory 128, which may include one or more modules 130 and which may store or otherwise have access to some or all of the components described with reference to the memory 118 of the video capture device 102. For instance, the memory 128 may have access to and utilize the modules 122 that perform video stitching and/or speech recognition operations. In some examples, the video capture device 102 may upload the video data 120 and/or the stitched video data 124 to the remote computing resources 108 for processing, given that the remote computing resources 108 may have a computational capacity that exceeds the computational capacity of the video capture device 102. Therefore, the video capture device 102 may utilize the functionality of the remote computing resources 108 for performing relatively complex analysis and processing of the video data 120 captured from the environment.

Alternatively, or in addition to the video capture device 102 stitching the video data 120 to generate the stitched video data 124, the video capture device 102 may transmit the raw video data 120 captured by the multiple cameras 114 to the remote computing resources 108. The remote computing resources 108 may then stitch together the video data to generate the stitched video data 124.

The video capture device 102, the user device 106, and/or the remote computing resources 108 may communicatively couple to the network 112 via wired technologies (e.g., wires, USB, fiber optic cable, etc.), wireless technologies (e.g., RF, cellular, satellite, Bluetooth, etc.), or other suitable connection technologies. The network 112 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other suitable connection technologies.

Regardless of whether the video data 120 is stitched together on the video capture device 102 by one or more modules 122 and the stitched video data 124 is transmitted to the remote computing resources 108, or whether the video stitching is performed remotely from the video capture device 102 (e.g., the video data 120 is sent to the remote computing resources 108 via the network 112 for stitching), the remote computing resources 108 may further process the stitched video data 124. More particularly, the remote computing resources 108, and in particular, the one or more modules 130, may apply, run, and/or execute one or more algorithms or classifiers with respect to the stitched video data 124 to identify one or more candidate frames of the stitched video data 124. The candidate frames may include frames of video that are determined to likely be of interest to the user 104. For instance, the algorithms may include human detection or object detection algorithms to identify people (e.g., the user 104 or friends, family, etc., of the user 104) and/or objects (e.g., a house, a ball, etc.) depicted in the frames of the stitched video data 124. The algorithms may also include face detection or smile detection algorithms to identify persons depicted within frames of the stitched video data 124 and whether those persons are smiling in the direction of the video capture device 102. In addition, the algorithms may include scene detection algorithms to determine scenes depicted within frames of the stitched video data 124, such as a beach scene, a forest scene, a sunset scene, an indoor scene, a sporting event scene, a home environment, and so on. The algorithms may also include background detection algorithms that determine the background depicted within the frames of the stitched video data 124. As a result, the remote computing resources 108 may execute the above algorithms to select a candidate frame that is likely to be of interest to the user 104.

Upon selecting the candidate frame, the one or more modules 130 of the remote computing resources 108 may apply, run, or execute one or more additional algorithms with respect to the selected frame in order to adjust the color of the frame and then apply this adjustments to the video data 124. Examples of the algorithms used to adjust the color of the video data 120 include, but are not limited to, algorithms configured to adjust lighting, brightness, contrast, color temperature, white balance, and saturation, among others. Moreover, such algorithms may additionally include blending algorithms that smooth the boundary transitions between stitched frames. Additional algorithms may include horizon leveling algorithms that help ensure that the horizon/background of the panoramic video 132 is level, as opposed to being uneven or wavy. Furthermore, the additional algorithms may determine the primary subject of the video, such as a person or a landscape, and may expose and/or adjust the color characteristics of the video data 120 to ensure the best quality video data 120 for the primary subject. The video data 120 that does not contain the primary subject may be adjusted to provide for a smooth color transition between the video data 120 that contains the primary subject and the video data 120 that does not contain the primary subject.

By way of example, primary video data may be video data 120 that includes a primary subject while secondary video data is video data 120 that does not include the primary subject. The primary video data may originate from a single camera 114, or may include stitched video data from adjacent cameras 114. The remote computing resources 108 may generate a panoramic video 132 that properly exposes and/or adjusts the color of the primary video data and blends the primary video data with the secondary video data to reduce the inconsistencies in color and exposure between the video data 120 captured by the multiple cameras 114 of the video capture device 102. The remote computing resources 108 may transmit the panoramic video 132 to the user device 106 (e.g., a cellular telephone, a laptop computing device, a tablet device, or any other device capable of receiving the panoramic video 132) associated with the user 104 via the network 112. The panoramic video 132, or a reduced-size version of the panoramic video 132, may be sent via an e-mail message, a text message, via a website, or in any other manner.

Figure 1A:
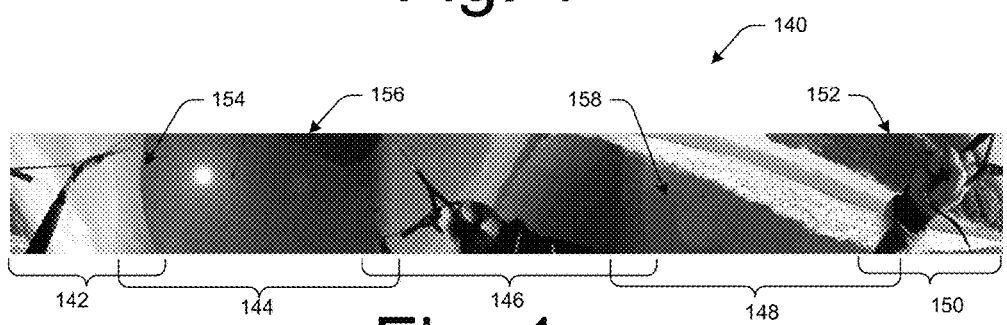
FIG. 1a illustrates a sample frame of a panoramic video captured by multiple cameras of a video capture device.

FIG. 1a shows a frame 140 of stitched video data 124 prior to applying the color adjusting algorithms. More particularly, the frame 140 is essentially a panoramic image 134 that was captured by four cameras 114 of the video capture device 102 and then stitched together to create a frame 140 of the video 132. The frame 140 reflects four distinct regions, 142, 144, 146, 148, where each region was captured by a different camera 114 of the video capture device 102. In some instances, the regions may overlap with adjacent regions, and the amount of overlap may vary, such as the overlap being about 5%, or 10%, or 20% or more. The regions thus have boundaries at their edges (e.g., edge boundaries) that may overlap with adjacent regions. As a result, a field of view corresponding to a particular region may overlap with the fields of view corresponding to adjacent regions.

The frame 140 depicts an image of a skydiver descending beneath a parachute over a beach. As can be seen, the different overlapping regions 142, 144, 146, and 148 exhibit different color, contrast, and lighting characteristics due in part to the video capture settings of the cameras 114 of the video capture device 102. For instance, region 148 and 150 appear to be properly exposed and shows a sufficient level of detail and good lighting, such as at 152 where the white wash from the ocean is very bright and the shadows of the hand are deep but still show a sufficient amount of detail. However, region 144, which depicts the sun, exhibits too much contrast. The bright areas of the image are too bright and the highlight details are lost, and the sky in the rest of the region 144 is underexposed and appears to be overly dark.

The boundaries between the regions 142, 144, 146, and 148 exhibit artifacts resulting from the different video capture settings of the cameras 114 of the video capture device 102. For example, a first boundary 154 shows a significant change between the properly exposed sky in the first region 142 and the sky as shown in the adjacent second region 144, which appears very dark in comparison, such as at 156. In fact, the frame 140 exhibits a bright line that delineates the boundary between the first region 142 and the second region 144. Additionally, at a third boundary 158 between the third region 146 and the fourth region 148, there is likely to be a significant amount of color banding. In other words, shades of the same color may not be accurately represented and abrupt changes between shades of the same color may be visible. This frame 140 can be greatly improved by executing one or more color adjusting algorithms as described in more detail below.

Figure 2:
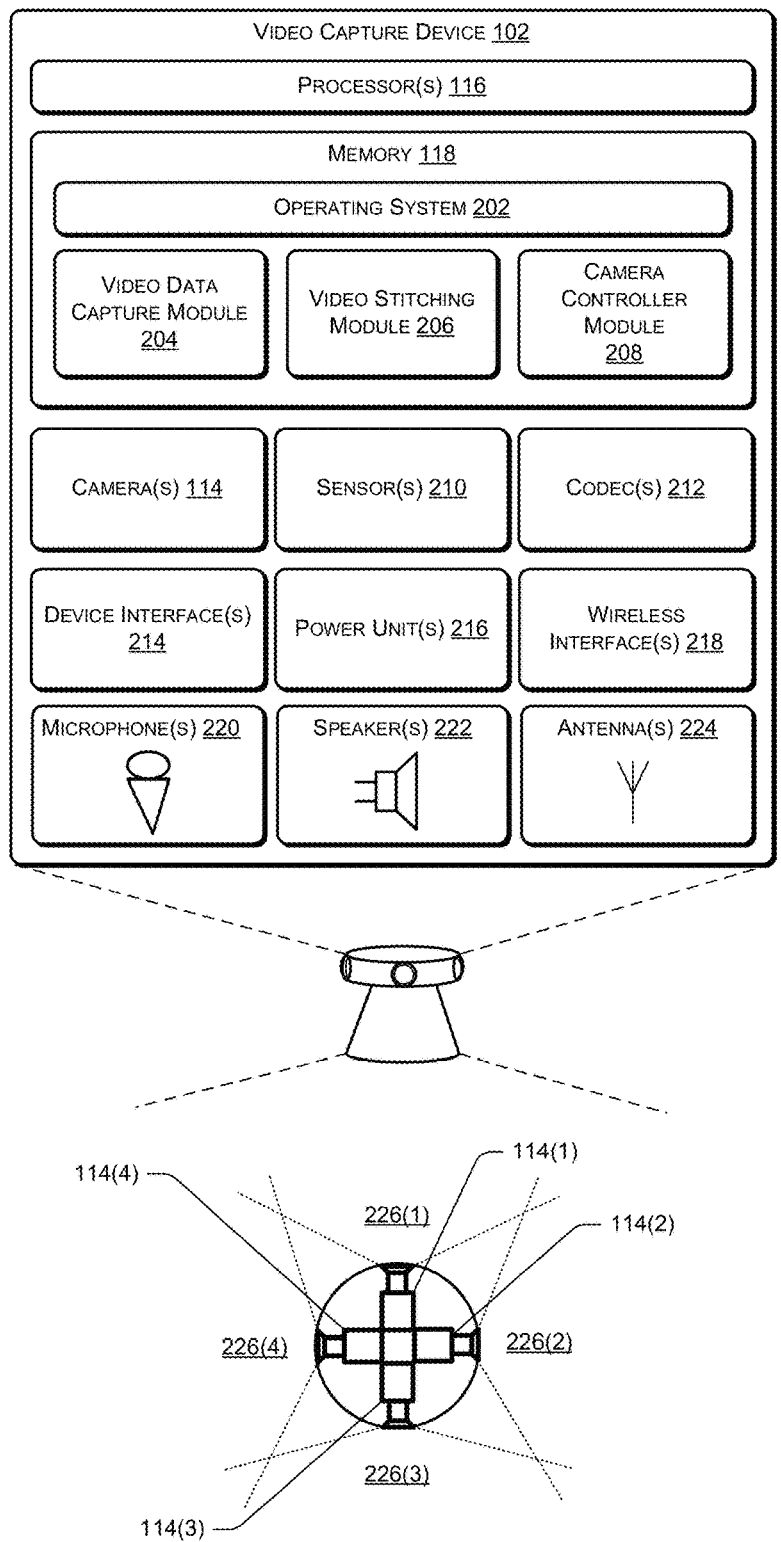
FIG. 2 illustrates an example device that includes multiple cameras configured to capture video data used to generate panoramic video.

FIG. 2 shows selected functional components and/or modules of one implementation of the video capture device 102 in additional detail. Generally, the video capture device 102 may be implemented as a standalone device that may be relatively simple or complex in terms of functional capabilities with input/output components, memory, and processing capabilities. For instance, the video capture device 102 may or may not have a keyboard, keypad, or other form of mechanical input in some implementations. The video capture device 102 may or may not have a display or touch screen to facilitate visual presentation and user touch input. Moreover, the video capture device 102 may be implemented with the ability to receive and output audio, video, and/or visual data, a network interface (wireless or wire-based), power, and processing/memory capabilities. As set forth above with respect to FIG. 1, the video capture device 102 may include multiple cameras 114 that capture video data 120 that is used to generate panoramic video 132 and/or panoramic images 134.

In the illustrated implementation, the video capture device 102 may include the processor(s) 116 and the memory 118. In various embodiments, the processor(s) 116 may execute one or more modules and/or processes to cause the video capture device 102 to perform a variety of functions, as set forth above and explained in further detail in the following disclosure. In some embodiments, the processor(s) 116 may include a central processing unit (CPU), a graphics processing unit (GPU), both CPU and GPU, or other processing units or components known in the art. Additionally, each of the processor(s) 116 may possess its own local memory, which also may store program modules, program data, and/or one or more operating systems. The processor 116 may include multiple processors 116 and/or a single processor 116 having multiple cores.

The memory 118 may include computer-readable storage media ("CRSM"), which may be any available physical media accessible by the processor(s) 116 to execute instructions stored on the memory 118. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 116. As will be discussed in additional detail, the memory 118 may include an operating system 202, one or more modules 122, such as a video capture module 204 and a video stitching module 206, and a camera controller module 208.

In addition to the processor(s) 116 and the memory 118, the video capture device 102 may include multiple cameras 114. For instance, as described in additional detail below, the video capture device 102 may include four cameras 114 that are positioned on/within the video capture device 102 approximately 90° from one another. Each of the multiple cameras 114 may capture video data 120, such as a video stream, within its corresponding field of view. As a result, by the four cameras 114 simultaneously capturing video, the video capture device 102 may capture 360° of video surrounding the video capture device 102. For the purposes of this discussion, the cameras 114 may include any type of camera 114 (e.g., high definition (HD) camera) that is capable of capturing video and/or images (e.g., still images, panoramic images, etc.).

The video capture device 102 may also include one or more sensors 210, codecs 212, device interfaces 214, power units 216, wireless interfaces 218, microphones 220, speakers 222, and antennas 224. For instance, the sensors 210 may include a motion detector to determine/measure the motion and/or the velocity of motion (e.g., speed, rate, etc. of rotational and/or translational motion) of the video capture device 102, a location sensor (e.g., GPS sensor) to determine the position/physical location of the video capture device 102, an accelerometer to determine the acceleration of movement of the video capture device 102, an inertial measurement unit (IMU) to determine the velocity and orientation of the video capture device, a gyroscope to determine or maintain the orientation of the video capture device 102, an altimeter/altitude meter to determine the altitude of the video capture device 102, a compass to determine the orientation/direction of the video capture device 102, a light sensor or light meter to help determine the proper exposure of the video capture device 102 based on ambient lighting conditions, and/or any other type of sensor 210 that may provide data that could be used by the system 100 to provide panoramic video 132 and/or utilized to determine the motion, velocity, acceleration, orientation, tilt, environmental lighting, etc., of the video capture device 102.

In addition, the video capture device 102 may include one or more codecs 212 that are coupled to the microphone(s) 220 and/or the speaker(s) 222 to encode and/or decode audio signals generated by the microphone(s) 220. The codec(s) 212 may convert audio data and/or video data between different formats.

One or more device interfaces 214 (e.g., USB, broadband connection, etc.) may further be provided as part of the video capture device 102 to facilitate a wired connection to a network, such as network 112, or a plug-in network device that communicates with other wireless networks. Moreover, one or more power units 216 may further be provided to distribute power to the various components of the video capture device 102. The power unit(s) 216 may include hardware that enables the video capture device 102 to be plugged into an outlet, thereby providing power to the video capture device 102. Alternatively, or in addition, the power unit(s) 216 may correspond to one or more batteries (re-chargeable or not) that may provide power to the video capture device 102. Provided that the video capture device 102 includes one or more batteries, the video capture device 102 may be carried and used by the user 104 while he/she moves between different locations. Additionally, while this disclosure primarily discusses embodiments utilizing four cameras 114, it should be appreciated that some embodiments can utilize more cameras 114, such as five, or six, or eight or more cameras 114.

In the illustrated example, the video capture device 102 may include one or more wireless interfaces 218 coupled to one or more antennas 224 to facilitate a wireless connection to a network (e.g., network 112). The wireless interface 218 may implement one or more of various wireless technologies, such as Wi-Fi, Bluetooth, radio frequency (RF), and so on.

The video capture device 102 may include a microphone unit that comprises one or more microphones 220 to receive audio input. The microphone(s) 220 of the video capture device 102 may detect audio (e.g. audio signals) from the environment 102, such as sounds uttered by the user 104 and/or other noise within the environment. For instance, the microphone(s) 220 of the video capture device 102 may detect audio commands uttered by the user 104, which may include audible instructions for the video capture device 102 to power on, begin recording video, stop recording video, and so on. The video capture device 102 may also include a speaker unit that includes one or more speakers 222 to output audio sounds. Such audio sounds may be responsive to the audio commands uttered by the user 104, or may provide various types of information to the user 104, or may be used during video playback on the video capture device 102.

Therefore, the user 104 of the video capture device 102 may interact with the video capture device 102 by speaking to it, and the microphone(s) 220 may capture sound and generate an audio signal that includes the user speech. The codec(s) 212 may encode the user speech and transfer that audio data to other components. The video capture device 102 can communicate back to the user 104 by emitting audible statements through the speaker(s) 222. In this manner, the user 104 may interact with the video capture device 102 simply through speech, without use of a keyboard or display common to other types of devices.

However, the video capture device 102 may include other user interface (UI) components that enable user interaction with the video capture device 102. For instance, the video capture device 102 may include haptic input devices, such as navigation buttons, keypads, joysticks, keyboards, touch screens, and the like. Furthermore, the video capture device 102 may include a display for text, graphical, or other visual output. The video capture device 102 may also include non-input control mechanisms, such as basic volume control button(s) for increasing/decreasing volume, buttons to cause the cameras 114 of the video capture device 102 to start and stop recording video data 120, buttons to adjust parameters (e.g., resolution, zoom, etc.) associated with the cameras 114, as well as power and reset buttons. There may additionally be controls that cause the video capture device 102 to generate panoramic still images or panoramic video. There may also be one or more simple light elements (e.g., LEDs around perimeter of a top portion of the device 106) to indicate a state such as, for example, when power is on or to indicate that the video capture device 102 is currently capturing video of the surrounding environment. Though, in some instances, the video capture device 102 may not use or need to use any input devices or displays.

In various embodiments, the memory 118 of the video capture device 102 may include the operating system 202. In some instances, the operating system 202 may be configured to manage hardware and services (e.g., device interface(s)

214, wireless interface(s) 218, codec(s) 212, etc.) within, and coupled to, the video capture device 102 for the benefit of other modules.

The camera controller module 208 may function to output any type of control or information to the cameras 114 of the video capture device 102 to enable capture of the video data 120. For instance, the camera controller module 208 may output information related to white balance settings based upon the current environment in which the video capture device 102 is located. Additionally, the camera controller module 208 may be responsible for sending signals to the cameras 114, such as start recording, stop recording, or capture a panoramic image, for example.

In addition, the memory 118 may include the video data capture module 204 and the video stitching module 206. Also, some or all of the components, modules, hardware, etc., may reside additionally or alternatively at the remote computing resources 108. In various embodiments, the video data capture module 204 may cause the multiple cameras 114 of the video capture device 102 to capture video data 120 of the surrounding environment. That is, assume that the video capture device 102 includes four different cameras 114—first camera 114, a second camera 114, a third camera 114, and a fourth camera 114. The video data capture module 204, may cause the first camera 114 to capture first video data 120, the second camera 114 to capture second video data 120, the third camera 114 to capture third video data 120, and the fourth camera 114 to capture fourth video data 120. As a result, the video capture device 102 may capture four, and possibly more, video streams simultaneously.

Due to the multiple cameras 114 of the video capture device 102 having overlapping fields of view, the video stitching module 206 may stitch together the video data 120 captured by the cameras 114 to generate the stitched video data 124, where the stitched video data 124 corresponds to 360° video. In various embodiments, the video capture device 102 may transmit the raw video data 120 captured by the cameras 114 to the remote computing resources 108, which may then stitch the video data 120. However, the video stitching module 106 may reside on the video capture device 102 and may first stitch together the video data 120 and then transmit the stitched video data 124 to the remote computing resources 108 for additional processing.

The video stitching module 206 may stitch the individual video streams such that video streams corresponding to a first camera 114 are stitched to video streams corresponding to the two cameras 114 that are adjacent to the first camera 114. As an example, where a video capture device 102 has four cameras 114, the video data 120 from the first camera can be stitched to the video data 120 from the second camera 114. Likewise, the video data 120 from the second camera 114 can be stitched to the video data 120 from the third camera 114. The video data 120 from the third camera 114 can be stitched to the video data 120 from the fourth camera 114. Finally, the video data from the fourth camera 114 can be stitched to the video data 120 from the first camera 114. The result is a continuous 360° video that incorporates video data 120 from the multiple fields of view 226 of each camera 114.

Each video stream, or even each frame within the video stream, may have metadata that includes various types of information about the video stream/frame. For instance, the metadata may indicate the specific camera 114 that captured the video stream. In addition, each frame of the video stream may include a time stamp indicating a time at which the frame was captured, a frame number, camera 114 video capture settings such as exchangeable file format data (EXIF data), location data, among others. As a result, the video stitching module 206 may stitch together the appropriate video streams (e.g., video streams from cameras 114 adjacent to one another). The video stitching module 206 may also be able to stitch together the appropriate frames of the video streams to one another, such that frames having identical, or nearly identical, time stamps are stitched to one another.

For the purposes of this discussion, video stitching may correspond to the process of combining multiple video streams having overlapping fields of view 226 to produce stitched video data 124 as a single video stream. The video stitching module 206 may utilize various types of video stitching software and/or video stitching algorithms to stitch the video streams to one another. In various embodiments, the independent video streams may be of varying quality, color, lighting, contrast, etc., and may not require exact overlap in order to be stitched. Upon stitching the video streams to each other, any seams between the video streams of the stitched video (i.e., stitched video data 124) may be reduced, or may not be detectable, as discussed below.

The video stitching module 206 can be configured to compare the independent video streams in terms of exposure, color, lighting, contrast, etc., and can smoothly blend the independent video streams together to create an aesthetically pleasing panoramic video 132. In some instances, this is performed by analyzing pixels in one frame of video data 120 with pixels in another frame of video data 120 captured by a different camera 114. For example, pixels occurring in a first frame of video data 120 may be located near the edge of the frame and may represent the sky. Pixels occurring in a frame of video data 120 captured by an adjacent camera 114, and having the same time stamp as the first frame, may also be located near the edge of the frame and represent the sky. The color value of these pixels can be compared and one or more algorithms can be executed, run, or otherwise applied, such as a blending gradient transition algorithm, to adjust the color values of the intervening pixels to smoothly blend the pixel colors to reduce or eliminate artifacts that may exist at the boundaries between frames of video data 120. In other instances, the video stitching module 206 may retrieve the exposure and color settings directly from the cameras 114 and use this information to smoothly blend the boundaries between the frames of the video data 120. This smoothing and blending at the boundary between the frames of video data 120 may be accomplished on the video capture device 102, or may be performed by the remote computing resources 108.

Additionally, the video data stitching module 206 may stitch the individual video streams and send the stitched video data 124 to the remote computing resources 108. The remote computing resources 108 may segment the stitched video data 124 into regions based upon factors other than which camera 114 captured the video data 120. This allows the stitched video data 124 to be segmented into more regions than there are cameras 114 to provide increased granularity for finer adjustments. The regions can be analyzed for subjects that may be of interest to the user 104 and color adjustments, including exposure, brightness, contrast, etc., can be performed individually on the regions, and the regions can be blended such as by applying smoothing and/or blending algorithms at the edge boundaries of the regions.

FIG. 2 further illustrates the video capture device 102 having four different cameras 114—a first camera 114(1), a second camera 114(2), a third camera 114(3), and a fourth camera 114(4). In various embodiments, the four cameras 114 are positioned on the video capture device 102 such that they are 90°, or approximately 90°, from one another. For instance, the first camera 114(1) and the third camera 114(3) may be associated with a first axis that is 90° from a second axis associated with the second camera 114(2) and the fourth camera 114(4). As a result, each of the four cameras 114 captures video in a different direction.

In addition, each of the four cameras 114 has a corresponding field of view 226. The field of view 226 for a particular camera 114 may correspond with the portion of the environment surrounding the video capture device 102 that is visible to that camera 114 when the camera 114 is positioned at a particular position and orientation. First objects within the field of view 226 of a camera 114 may be depicted within video data captured by that camera 114, while second objects outside of that field of view 226 will not be depicted in that video data, although such second objects may be included in the field of view 226 of a different camera 114 of the video capture device 102. Moreover, the field of view 226 of a camera 114 of the video capture device 102 may change in response to movement (e.g., vertical movement, horizontal movement, rotation, etc.) of the video capture device 102.

As shown in FIG. 2, each of the cameras 114 may have a corresponding field of view 226, such that the first camera 114 has a first field of view 226(1), the second camera 114(2) has a second field of view 226(2), the third camera 114(3) has a third field of view 226(3), and the fourth camera 114(4) has a fourth field of view 226(4). As shown, the fields of view 226 of adjacent cameras 114 of the video capture device 102 may overlap. For instance, the field of view 226(1) of the first camera 114(1) overlaps with the second field of view 226(2) of the second camera, and overlaps with the fourth field of view 226(4) of the fourth camera 114(4). Therefore, certain objects included in the first field of view 126(1) of the first camera 114(1) may also be included in the second field of view 126(2) of the second camera 114(2) or in the fourth field of view 126(4) of the fourth camera 114(4), and vice versa. As a result, the cameras 114 of the video capture device 102 are able to capture video in multiple different directions, which allows the stitched video data 124 to represent a 360° video of the environment surrounding the video capture device 102.

Figure 3:
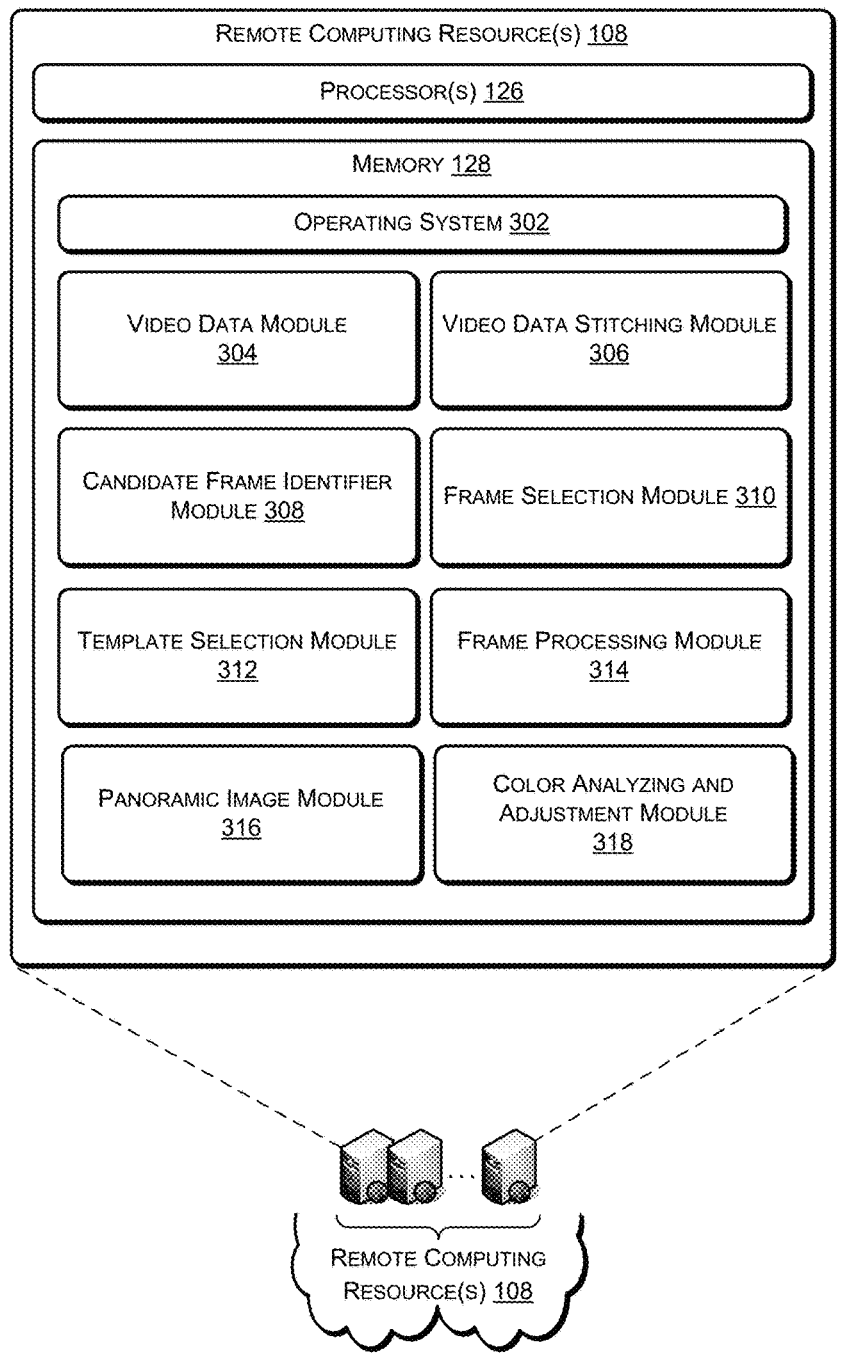
FIG. 3 illustrates an example device that is configured to generate panoramic video based on video data captured by multiple cameras and to analyze and adjust the color of frames of the video data.

FIG. 3 shows selected functional components and/or modules of one implementation of the remote computing resources 108 in additional detail. As shown, the remote computing resources 108 may include processor(s) 126 and memory 128, which may include an operating system 302, a video data module 304, a video data stitching module 306, a candidate frame identifier module 308, a frame selection module 310, a template selection module 312, a frame processing module 314, a panoramic video module 316, and a color analyzing and adjustment module 318. Moreover, the remote computing resources 108 may generate a panoramic video 132 or a panoramic image 134 from video data 120 captured by multiple cameras 114 of the video capture device 102.

In certain embodiments, the video data module 304 may receive video data 120 captured by the multiple cameras 114 of the video capture device 102. The video data module 304 may receive each of the raw video streams captured by each camera 114. In this scenario, the multiple cameras 114 of the video capture device 102 may capture frames of video, encode the frames of video, and then send, via the network 112, the encoded frames of video to the remote computing resources 108. Alternatively, the video data module 304 may receive the stitched video data 124 from the video capture device 102. That is, at least a portion of the stitching of the video data 120 may be performed by the video capture device 102.

Provided that video capture device 102 provided the video streams to the remote computing resources 108, or only stitched a portion of the video streams, the video data stitching module 306 of the remote computing resources 108 may stitch together the video data 120 captured by the multiple cameras 114 of the video capture device 102 using the techniques described herein. For instance, the video data stitching module 306 may decode the encoded video streams transmitted by the video capture device 102 and stitch the frames together, thereby generating the stitched video data 124, which may represent 360° video. The remote computing resources 108 may then perform additional processing on the stitched video data 124.

Alternatively, prior to stitching together the video data 120 captured by the multiple cameras 114 of the video capture device 102, the remote computing resources 108 may first process the video data 120. For instance, the video data module 304 or the video data stitching module 306 may determine that color correction or other adjustments should be applied to one or more video streams received from the video capture device 102. The color correction or other adjustments may include one or more of lighting, contrast, color temperature, white balance, sharpness, hue, saturation, or other adjustments and may be applied to one or more of the video streams before they are stitched together. In one example, a sample frame is chosen and analyzed from the video stream and the color correction or other adjustment algorithms are applied to the frame and then subsequently applied to other frames within the same video stream captured by the same camera 114. Each video stream from each camera 114 may likewise be analyzed and adjusted independently prior to stitching the multiple video streams.

In some instances, the frame analysis and adjustment may be performed on multiple frames contained within the video data 120 captured by a single camera 114 of the video capture device 102. For instance, frames may be selected that are one second apart within the video stream, or ten seconds apart, or some other interval. These time separated frames are analyzed and compared to one another, and any differences in the calculated adjustments between these two frames can be gradually applied to the intervening frames to create a smooth transition between sequential frames of the video data 120.

Continuing with the example in which the video streams captured by each camera 114 of the video capture device 102 may be analyzed and adjusted prior to stitching, the video stitching module 306 may analyze the separate video streams and apply one or more algorithms to smooth the transition at the boundary of each video stream as they are stitched together. As discussed herein, because each individual camera 114 may have different video capture settings, each video stream may look very different from the video stream captured by an adjacent camera 114 of the video capture device 102. Accordingly, the video stitching module 306 can apply one or more algorithms along the edge boundary between video streams captured by adjacent cameras 114 to smooth the transition between video streams. For instance, the video stitching module 306 may select individual pixels from frames of different video streams and analyze the difference between the pixels. The video stitching module 306 may then apply a smooth gradient transition to the intervening pixels to smoothly transition the pixel color along the border between frames captured by adjacent cameras 112 within the video capture device 102 to result in a smooth and more natural color transition.

In certain embodiments, a panoramic image is created for a user 104, either upon request by the user 104, or automatically. The candidate frame identifier module 308 may identify one or more frames of the stitched video data 124 that depict content that is likely to be of interest to the user 104, and therefore could serve as a candidate for a panoramic image 134 to be provided to the user 104. Additionally, the one or more identified frames are likely to contain the primary subject matter of a panoramic video 132. That is, the candidate frame identifier module 308, as it determines frames that are likely of interest to a user 104 for a panoramic image 134, will also determine the likely primary subject of a panoramic video 132. In many cases, when a user 104 desires to capture video, there is one or more specific objects, people, or events that the user desires to capture on the video. The specific objects, people, or events may be considered a primary subject of the video. The primary subject identification can be used to ensure the panoramic video 132 is properly exposed and/or adjusted to present the primary subject in an aesthetically pleasing way.

The candidate frame identifier module 308 may identify one or more candidate frames of the stitched video data 124 that may be deemed of interest to the user 104 using one or more algorithms and/or classifiers. The remote computing resources 108 may be able to determine which portions of the stitched video data 124 are likely to be of interest to the user 104 based at least partly on specific persons, objects, scenes, etc., that are depicted within those portions. The remote computing resources 108 may also be able to determine which frames of the stitched video data 124 are of better quality, do not contain blurriness, have good color/contrast balance, and so on. Such frames may serve as good candidates to use in order to extract a panoramic image 134 and/or be used to adjust a panoramic video 132 to present the primary subject in an aesthetically pleasing way.

The candidate frame identifier module 308 may utilize one or more algorithms (e.g., audio-based algorithms, computer vision algorithms, etc.) to determine frames in the stitched video data 124 that have a requisite degree of interest. For the purposes of this discussion, such algorithms may be referred to as a first set of algorithms. Using these algorithms, the candidate frame identifier module 308 may assign varying interest levels (e.g., varying numerical values) to frames of interest in the stitched video data 124. Frames within the stitched video data 124 having a higher interest level/value may be those frames that include people, frames that depict individuals smiling towards the location from which the video was captured, frames that depict various scenes (e.g., a room of a house, a beach, mountains, etc.), and so on. The algorithms may be applied to the stitched video data 124 (e.g., the stitched video data 124 may be considered an input for the algorithms) and the output of the algorithms may indicate an interest level/value of different frames of the stitched video data 124. That is, the algorithms may output weights for the frames, where the weights may correspond to a likelihood that the frame is to be of interest to the user 104, as compared to other frames of the stitched video data 124.

The algorithms may include one or more object detection, recognition, and/or identification algorithms that may detect, recognize, and/or identify objects depicted within various frames of the stitched video data 124. Such objects may include people, a building, a landmark, and so on. Object detection algorithms may identify certain objects that are known to be of interest to, or at least are likely to be of interest to, the user 104. The algorithms may also include human detection algorithms that determine whether a person is depicted within a particular frame. Human detection algorithms may determine whether friends, family members, co-workers, etc., are depicted within frames of the stitched video data 124. Face detection algorithms may be configured to detect faces depicted within frames, and may also be able to determine whether the faces are directed towards the camera 114 and to identify the identity of the person. In addition, smile detection algorithms may be able to determine whether individuals depicted within frames of the stitched video data 124 are in fact smiling, and whether those individuals are smiling towards the camera 114 that captured the video/image. Since it is likely that the user 104 would like an image of friends, family members, etc., that are smiling in the direction of the camera 114, the remote computing resources 108 may identify frames of the stitched video data 124 that depict such content.

The algorithms may also include one or more scene detection algorithms that are configured to detect a scene or landscape depicted within frames of the stitched video data 124. For instance, the scene detection algorithms may determine whether frames of the stitched video data 124 depict a home setting, a beach setting, a mountain setting, a city setting, a lake setting, and so on. The scene detection algorithms may identify individual pixels in the frames and classify the pixels differently, such as by classifying some pixels as sky, others as water, others as beach, others as grass, and so on. By identifying different scenes depicted within the frames, the candidate frame identifier module 308 may identify settings or scenes that are likely to be of interest to the user 104 (e.g., the beach, a mountain range, etc.), while identifying other settings or scenes that likely would not be of interest to the user 104 (e.g., an unaesthetically pleasing building). In addition, the algorithms may include background detection algorithms that detect/determine the background (e.g., sky, water, mountains, etc.) depicted within a particular frame. Accordingly, the remote computing resources 108 may identify picturesque scenes that would serve as good candidates for a panoramic video 132 and/or a panoramic image 134.

As stated above, the candidate frame identifier module 308 may assign interest levels or values to different frames of the stitched video data 124, where the interest levels/values are based on the objects, individuals, scenes, etc., depicted within the frames. The objects/features/content depicted within the frames may contribute to the interest levels/values that are attributed to those frames and may further identify a likely primary subject for a panoramic video 132. For instance, detection/identification of a face depicted in a frame may correspond to a first value representing a first level of interest, a level horizon of a frame may correspond to a second value representing a second level of interest, detection of a particular scene depicted in a frame may correspond to a third value that represents a third level of interest, and so on. In addition, the interest levels/values of the frames of the stitched video data 124 may be illustrated as a curve that includes a data point for each frame of the stitched video data 124. Using the curve, the candidate frame identifier module 308 may determine which frames are the best candidates for generating a panoramic video 132 and/or a panoramic image 134 for the user 104.

In various embodiments, the frame selection module 310 may select a frame of the candidate frames identified by the candidate frame identifier module 308. The selected frame may serve as a frame that is to be used to generate the panoramic video 132 and/or the panoramic image 134 that is to be sent to the user 104. The frame that is selected by the frame selection module 310 may be the frame within the stitched video data 124 that has the highest interest level/value, or that has a relatively high interest level/value, which may indicate that the selected frame depicts content that is most likely to be of interest to the user 104, and may depict content that is suitable to be depicted in the panoramic video 132 and/or the panoramic image 134. In other embodiments, provided that a first frame is associated with a first interest level/value that is greater than a second interest level/value associated with a second frame, the frame selection module 310 may select the first frame over the second frame. Moreover, the frame selection module 310 may select one or more frames that have corresponding interest levels/values that are above a threshold value.

In certain embodiments, the remote computing resources 108 may determine or classify the composition or content of the selected frame. That is, the remote computing resources 108 may determine the type of scene that is depicted within the selected frame, where the type of scene may include a beach scene with water and sand, a home setting, a landscape scene having mountains and trees, an action scene, and so on. Metadata associated with the frame may also indicate the type of content depicted within the selected frame. Based on the composition of the scene, the template selection module 312 may identify a template that is appropriate to apply to the selected frame. For instance, for an action scene having moving objects, an action template may be selected and applied to the selected frame, whereas a landscape template, a beach template, or an indoors template may be used for frames having different compositions.

In some instances, the video capture device 102 may be uneven (e.g., tilted at an angle) when the multiple cameras 114 capture the video data 120. As a result, the selected frame may also be uneven or crooked. The frame processing module 314 may apply or execute one or more algorithms (e.g., horizon leveling algorithms) that are configured to detect the horizon associated with the content depicted in the selected frame, and rotate the panoramic image 134 and/or the frames in the panoramic video 132 so that the horizon is level and flat/even. Accordingly, even if the video capture device 102 was crooked when the video data 120 was captured, thereby resulting in unlevel frames of the stitched video data 124, the remote computing resources 108 may nonetheless generate a relatively level panoramic image 134 and/or panoramic video 132.

In some embodiments, the stitched video data 124 may appear to be wavy or uneven due to the movement of the cameras 114 while recording video as the video capture device 102 moves or rotates on one or more of its axes. For instance, each of the cameras 114 may move a different direction as the video capture device 102, or a just portion of the video capture device 102, moves upwards, downwards, to the side, and/or rotates. The horizon detection algorithm(s) may be utilized to detect the waviness of the stitched video data 124 and to rotate the frames of the video data 120 in the appropriate direction.

The alignment of the frames captured by the cameras 114 may also be leveled prior to stitching the video streams together. For instance, the remote computing resources 108 may use data obtained from one or more of the sensors 210 of the video capture device 102. Such sensor 210 data may include the orientation, tilt, rotation, movement, etc., of the video-capture device 102 as the cameras 114 were capturing the video data 120. The sensor 210 data may indicate an extent to which the video capture device 102 was crooked (not level) at that time, and the frames of the video data 120 may be rotated to compensate for the tilt of the video capture device 102. That is, before the video streams are stitched together, the frames can be rotated and blended such that the stitched video data 124 appears to be seamless, or relatively seamless. In other embodiments, provided that the video streams have already been stitched together, the frame processing module 314 may partition the frames of the stitched video data 124, align the frames with their corresponding adjacent frames, and stitch the frames together again. Furthermore, the frame processing module 314 may apply or run one or more algorithms that perform additional processing to enhance the quality or aesthetics of the selected frame, such as by performing blending, increasing/decreasing contrast, adjusting color, applying a filter, adding a caption, removing/reducing distortions and/or blur, and so on.

Since the stitched video data 124 is generated from video data 120 captured from multiple cameras 114 of the video capture device 102, the selected frame may depict content that was captured by two different cameras 114. For instance, provided that the selected frame depicts an individual or object that was included in both a first field of view 226 of a first camera 114 and a second field of view 226 of a second camera 114 at the time the selected frame was captured, the resulting panoramic image 134 may be generated from video simultaneously captured by two different cameras 114 with overlapping fields of view 226.

Therefore, the frame processing module 314 and/or the panoramic video module 316 may process and/or modify the selected frame to generate a panoramic video 132 and/or a panoramic image 134. The panoramic video 132 and/or the panoramic image 134 may then be provided to the user 104 associated with the video capture device 104, or any other individual. For instance, the panoramic video 132 and/or the panoramic image 134 may be sent to a user device 106 associated with the user 104 via a website, an e-mail message, a text message, or in any other manner. In some embodiments, the panoramic video 132 and/or the panoramic image 134 may be displayable via a display associated with the video capture device 102.

The output from the candidate frame identifier module 308 and/or the frame selection module 310 results in a high degree of likelihood that the individuals, objects, scenes, etc. that are determined to likely be of interest to a user, also serve to identify a likely primary subject of a panoramic video 132. That is, as the frame selection module 310 identifies frames that likely represent subject matter that the user 104 will be interested in viewing, the subject matter appearing in the frames is also a likely candidate for the primary subject of a panoramic video 132. Consequently, once the primary subject is identified within a field of view 226 for a particular camera 114, the video data 120 captured from that camera 114 can be adjusted for proper exposure and color correction to present the panoramic video 132 in which the primary subject is presented in an aesthetically pleasing way.

The proper exposure and color correction can be done by the remote computing resource 108 after the video data 120 has been captured, or alternatively, can be performed at the camera 112 as the video data 120 is being captured. For instance, the video capture device 102 can determine the type of scene within the field of view 226 of the video capture device 102, and automatically adjust video capture parameters, such as hue, saturation, contrast, white balance, exposure, and brightness to best expose for the scene of interest. For example, if the video capture device 102 is indoors capturing an event (e.g., a birthday party), it can apply a relevant template, such as a low-light indoor template, to automatically adjust individual camera 114 settings such as white balance, sensor sensitivity, contrast, and so forth to properly expose the video data 120 based on the type of the scene. Similarly, if the video capture device 102 is capturing a beach scene, it can determine the most likely primary subject and set one or more cameras 114 to properly expose the beach scene. Moreover, where the video capture device 102 and/or the remote computing resource 108 determines that there is likely more than one primary subject, or where the exposure settings are vastly different between the cameras 114, each camera 114 can be separately adjusted (e.g., manually, in an automated manner, in a partially-automated manner, etc.) to account for the different optimal exposure settings for the scene within the camera's 114 field of view 226. Finally, the video capture device 102 may allow a user 104 to indicate the type of scene that is being captured. For example, a user 104 may be able to specify that a sunset is being recorded and the cameras 114 can be adjusted to properly capture the sunset scene. The cameras 114 may also have different video capture settings depending on the scene being captured that are automatically set for each camera whether the scene is automatically detected or manually identified. The cameras 114 may utilize the same settings depending on the scene being captured, or may have different settings as a result of different scenes in each camera's 114 field of view 226.

As an example, if the video capture device 102 is capturing a beach scene at sunset, one camera 114 may be set for a proper exposure of the beach and water along with the setting sun, while another camera 114 may have settings to properly expose for a portrait of a person on the beach looking out over the water. Another camera may be pointing at a cliff side with crashing waves in full shade, which will require different video capture settings as compared to the other cameras 114 in the video capture device 102 in order to expose for this scene. With this variety of scenes being simultaneously captured by the video capture device 102, the sensor sensitivity (ISO) settings, white balance setting, contrast, lighting, brightness, and other exposure settings of each camera 114 may result in individual video streams that exhibit dramatically different colors, contrast, and lighting characteristics. For instance, the camera 114 having the setting sun and the water within its corresponding field of view 226 will likely have to reduce the amount of contrast in order to fully capture the beach scene, given the strong back light provided by the setting sun. Contrarily, the camera 114 having the cliff within its corresponding field of view 226 may have to increase the contrast setting in order to distinguish the details within the shadow areas of the scene. Finally, the camera 114 having the person within its corresponding field of view 226 may need to adjust the white balance or otherwise provide a warm color temperature to properly capture the person's skin tone. Moreover, the white balance between the scenes depicting the fully shaded cliff side scene versus the scene depicting the direct evening sun will be different. The result is that objects that may be common to each of the camera 114 fields of view 226, such as the sand, or the sky, may look very different based on the different settings of each camera 114 that are utilized in order to properly expose each scene.

In some embodiments, the video capture device 102 anticipates the primary subject(s). In this example, the primary subject may be the person standing on the beach, although the video capture device 102 may also anticipate that the sunset is another primary subject, or perhaps a secondary subject. The identification of the primary subject(s) and/or secondary subjects can be determined by algorithms run by the candidate frame identifier module 308 and/or the frame selection module 310 as has been described herein.

Based on this determination, a first camera 114 capturing the person may be set to properly expose and capture the individual. In one instance, the remaining cameras 114 can all be set with the identical exposure settings as the first camera 114. The resulting stitched video data 124 may include a portion that is properly exposed for the person, another portion that is likely overexposed for the sunset scene, and even another portion that is likely underexposed for the cliff scene.

Alternatively, the first camera 114(1) can be set to properly expose for the portrait, while a second camera 114(2) can be set to properly expose for the sunset beach scene. While third and fourth cameras 114(3), 114(4) can likewise be adjusted to properly expose for the scenes detected within their respective fields of view 226, in some instances, the third and fourth cameras 114(3), 114(4) can be set with the same exposure settings as either the first camera 114 or the second camera 114, or somewhere in between. In this way, the most likely primary and secondary subjects within a full 360° scene will be properly exposed within the panoramic video 132. The remaining portions of the panoramic video 132 can be blended with the portions of the video data 120 containing the primary subject(s) and/or the secondary subject, such as by performing a color gradient blend at the boundary between stitched video data streams.

In some instances, the video capture device 102 will have a primary direction of video capture. This may be based upon an indication on the video capture device 102 itself, such as marking one of the cameras 114 as the primary camera 114, or indicating on the video capture device 102 which direction is the primary direction of video capture. A user 104 may also be able to indicate the primary direction of video capture.

The primary direction of video capture can be used to weight the exposure and other camera settings of the various cameras 114. For example, the camera 114 pointing in the primary direction of video capture (the primary camera 114), can be set to properly expose for the scene within its field of view 226. The remaining cameras 114 can then be set to the same video capture settings as the primary camera 114. In this way, if the camera is rotated about a vertical axis, each camera 114 will properly expose for the subject of interest regardless of which camera 114 has the primary subject within its field of view 226.

In other instances, the cameras 114 can each have their exposure settings adjusted for the scene within their individual fields of view 226. The primary camera 114 can have exposure settings that are weighted and can be used to adjust the exposure settings of the remaining cameras 114. Using weighted settings of the primary camera 114 to adjust the settings of the remaining cameras 114 may help to reduce artifacts between video streams captured by the different cameras 114 having different video capture settings.

FIGS. 4-7 are flow diagrams of illustrative processes for generating one or more panoramic videos 132 based on video data 120 captured by multiple cameras 114 of a video capture device 102. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, some of the operations can be repeated during the process.

Figure 4:
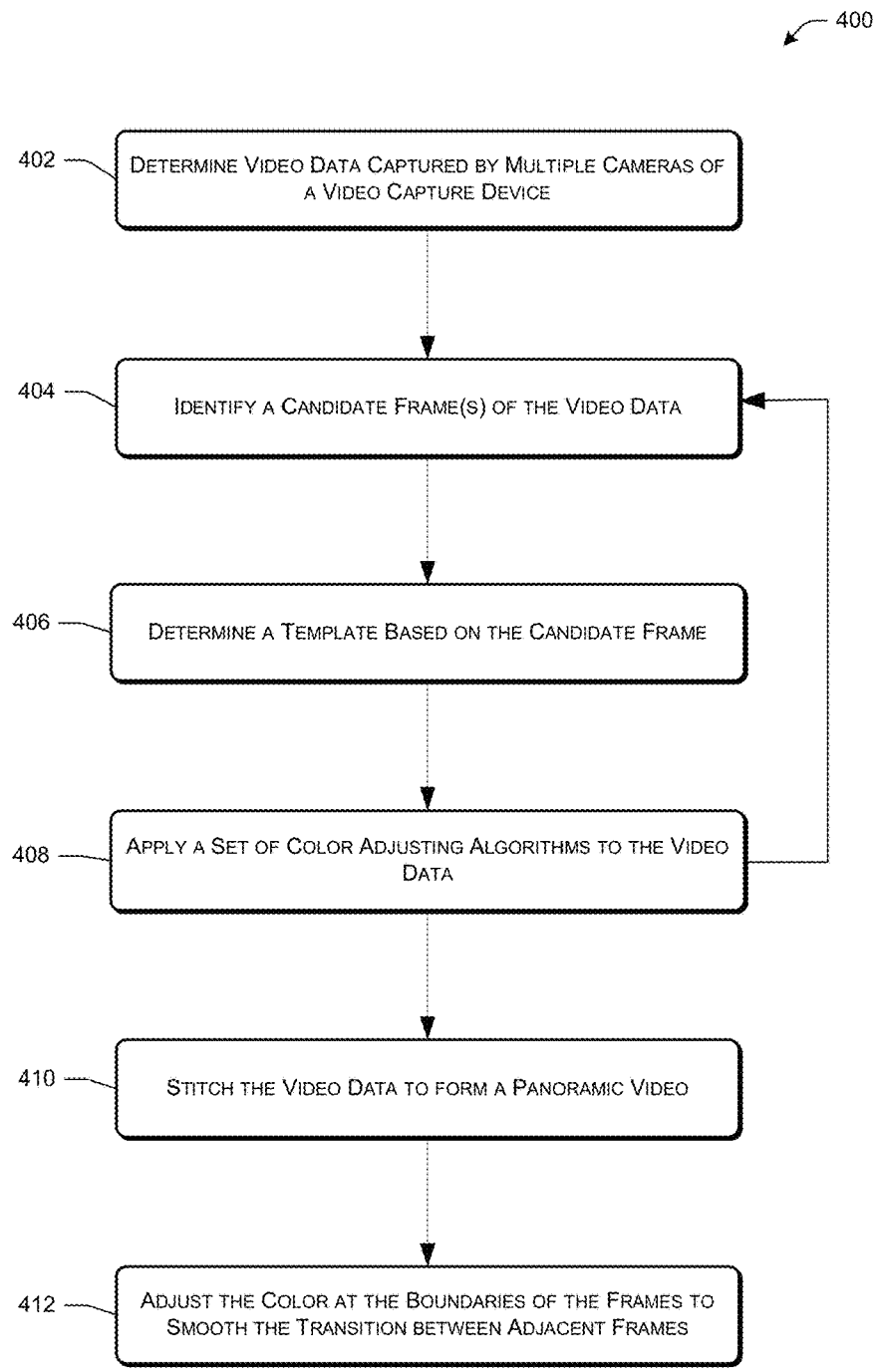
FIG. 4 is a flow diagram illustrating an example process of generating a panoramic video based on video data captured by multiple cameras of a device and adjusting the color of the video data based on the scene being captured by the multiple cameras.

FIG. 4 is a flow diagram illustrating an example process 400 of generating a panoramic video 132 based at least partly on one or more algorithms and video data 120 captured by multiple cameras 114 of a video capture device 102. In one example, the panoramic video is generated based on video data 120 captured by multiple cameras 114 of a video capture device 102 and applying color adjusting processes to adjust the color of the video data 120 based on the scene being captured by the multiple cameras 114, and based on the differences in color between the video data 120 captured by the multiple cameras 114.

The following actions described with respect to FIG. 4 may be performed by the video capture device 102 and/or the remote computing resource(s) 108, as illustrated in, and described with respect to, FIGS. 1-3.

Block 402 illustrates determining video data 120 captured by multiple cameras 114 of a video capture device 102. In various embodiments, multiple cameras 114 of the video capture device 102 may each capture a video stream within a corresponding field of view 226. For instance, four different cameras 114 that are positioned approximately 90° from one another may simultaneously capture video data 120. In some embodiments, the video capture device 102 may transmit the raw video streams to the remote computing resources 108 for stitching. In other embodiments, the video capture device 102 may include one or more modules 122 that apply/run/execute video stitching algorithms to stitch together the video streams, thereby creating a 360° video (i.e., the stitched video data 124). The stitched video data 124 may then be sent to the remote computing resources 108.

Block 404 illustrates identifying a candidate frame of the video data. As described above, identifying a candidate frame is useful for creating a desired panoramic image 134 and may also be useful for determining the primary subject of a panoramic video 132. The candidate frame may be determined by applying a first set of algorithms to video data 120 either before or after the video data 120 has been stitched in order to identify frames that are likely to contain primary subject(s) of the video. Regardless of whether the video data 120 is stitched by the video capture device 102 and/or the remote computing resources 108, the remote computing resources may run one or more algorithms with respect to the video data 120 or the stitched video data 124 in order to identify frames that are likely to be of interest to a user 104 associated with the video capture device 102 and possibly other individuals.

Moreover, utilizing the first set of algorithms, the remote computing resources 108 may identify frames of the video data 120 that depict individuals, various objects, certain scenes, and so on, that are likely to be of interest to the user 104. In addition, the remote computing resources 108 may identify frames that are of good quality (e.g., color, contrast, no blurriness, etc.) and/or frames that depict individuals that are facing the camera, individuals that are smiling, individuals performing various gestures (e.g., waving, giving a "thumbs up" sign, etc.). As a result, the candidate frames are likely to contain primary subject(s) and/or secondary subject(s). The primary and/or secondary subjects can be identified and the frames containing the primary and/or secondary subject may be used to adjust and/or correct the resulting panoramic video 132 to provide a panoramic video 132 that will be aesthetically pleasing to a user. For example, once the frames containing the primary and/or secondary subjects are identified, algorithms may be executed or run on those particular frames in order to improve the color of those frames, and the same adjustment settings can then be applied on the remaining video data 120. For example, various algorithms may be executed that can adjust the brightness, contrast, lighting, saturation, hue, sharpness, and white balance, among others, of the video data 120. In any event, adjusting the color of the video data 120 may be performed by analyzing pixels within frames of video data 120 and changing the color of individual pixels to provide the desired color adjustments. Moreover, a candidate frame can be selected for creating a panoramic image 134.

Block 406 illustrates determining a template for the frame based at least partly on the content depicted in the frame. In certain embodiments, the remote computing resources 108 may determine the content or composition depicted within the candidate frames, such as whether the selected frame depicts an indoor scene, a beach scene, a city landscape, a mountain scene, and so on. Moreover, the scene identification may be provided by the video capture device 102, such as in metadata associated with the video data 120 or individual frames of the video data 120. The remote computing resources may apply an appropriate template to the selected frame based on the content/composition of the selected frame. The template may be an identification of the type of scene depicted (e.g., beach, snow, landscape, sunset, indoors, portrait, etc.).

Block 408 illustrates applying a set of color adjusting algorithms to the video data. Upon selecting the frame and determining an appropriate template for the frame, the remote computing resources 108 may apply color adjusting algorithms with respect to the selected frame. For instance, at least in part based upon the template, the remote computing resources may apply algorithms to the selected frame that will adjust one or more characteristics of the frame such as, for example, brightness, contrast, saturation, hue, white balance, color temperature, softening, sharpening, vignetting, and lighting, among others. These adjustments may be collectively referred to as color adjustments, since at the pixel level, the adjustments change the color of pixels present in frames of video data 120. The remote computing resources 108 may also run horizon leveling algorithms that determine a horizon of the selected frame and to level the selected frame if the horizon is determined to be uneven or wavy.

In some instances, first color adjustments are made to sequential frames in the video data 120 up to a predetermined number of frames, at which point, a next frame is analyzed to determine whether the same first adjustments continue to apply to subsequent frames. Accordingly, the process may loop from block 408 back to block 404 to verify whether the selected color adjustments should continue to be applied to subsequent frames of the video data. If the video capture device 102 and/or the remote computing resources 108 determine that the first adjustments should continue to be applied to the frames in the video data 120, then the process continues to apply the first adjustments to a predetermined number of subsequent frames in the video data 120. However, if the system 100 determines that different, second adjustments, should be applied to a next frame, the second adjustments can be gradually applied over several frames to provide for a smooth transition between frames that had the first adjustments applied and frames in which the second adjustments were applied. This can result in gradual transitions across multiple frames, rather than abrupt changes between one frame and a sequential frame of video data 120.

Block 410 illustrates stitching the video data to form a panoramic video 132. The video stitching module 206 may stitch the video streams together. The frames from one video stream can be matched to frames of another video stream captured by an adjacent camera 114 by comparing the time stamps of each frame. Alternatively, as the cameras 114 all begin capturing video data 120 simultaneously, each frame can be numbered, and the like-numbered frames can be matched to one another in preparation for the stitching process.

The frames are preferably stitched together such that the video stream from the first camera 114 is stitched to the video stream captured by the second camera 114, which is, in turn, stitched to the video stream from the third camera 114. The video stream from the third camera 114 is stitched to the video stream from the fourth camera 114, which is, in turn, stitched to the video stream from the first camera 114. In those embodiments in which a video capture device 102 includes four cameras 114 each positioned approximately orthogonally to one another, and have overlapping fields of view, a 360° panoramic video can be created.

Block 412 illustrates adjusting the color at the boundaries of the frames of the video data to smooth the transition between adjacent frames. As discussed above, frames of video data 120 from different cameras 114 may exhibit different colors for representing common objects. For example, adjacent frames, captured by two different cameras 114 having different video capture settings, may represent the sky with different shades of blue. Consequently, when the video streams are stitched together, there may be an abrupt change of color in the sky where the frames of video data 120 are stitched together. One or more algorithms can be used to compare the color changes at the boundaries of adjacent frames of video data 120 and adjust the color of pixels near the boundaries of the frames to provide a smooth color transition between the stitched frames. For example, pixels near the boundary of adjacent frames can be analyzed for a color difference between the frames. An algorithm, such as a gradient blending algorithm, can shift the colors of the pixels within the adjacent frames so that any differences in color of common elements between the frames can be gradually shifted from one frame to the adjacent frame.

Moreover, during the stitching process, or subsequent to the stitching process, the video data 120 from each video stream may be blended to smooth the transitions between the edges of the stitched frames. Because each camera 114 may have different video capture settings, the video data 120 may look significantly different from one video stream to another in terms of color, brightness, contrast, etc. The stitched video data 124 is preferably blended at the boundary of each frame from adjacent video streams to allow for a smooth transition around the entire 360° panoramic video.

The blending can be performed by comparing pixel color between selected pixels in adjacent frames and performing a color adjustment process, such as a smoothing, gradient fill, smudging, or color blending, for example, to smooth the color transition between frames that are stitched together at their boundaries. As used herein, adjacent frames of video data 120 are frames that are captured by adjacent cameras 114 that are to be stitched together at their edges. Adjacent frames of video data 120 will have an identical, or substantially identical, timestamp in those embodiments in which the frames have associated metadata that includes a time stamp. Conversely, sequential frames are those frames of video data 120 that are captured by a single camera 114 at different times, but are positioned one after the other within the video data 120.

Alternatively to the pixel color comparison process described above, the camera 114 video capture settings used to capture the video streams (e.g., EXIF data) can be compared between adjacent frames and the stitched frames can be adjusted based on the camera's 114 differing video capture settings, such as by applying adjustments to the frames along their edge boundary based upon each camera's 114 exposure and color settings.

Figure 5:
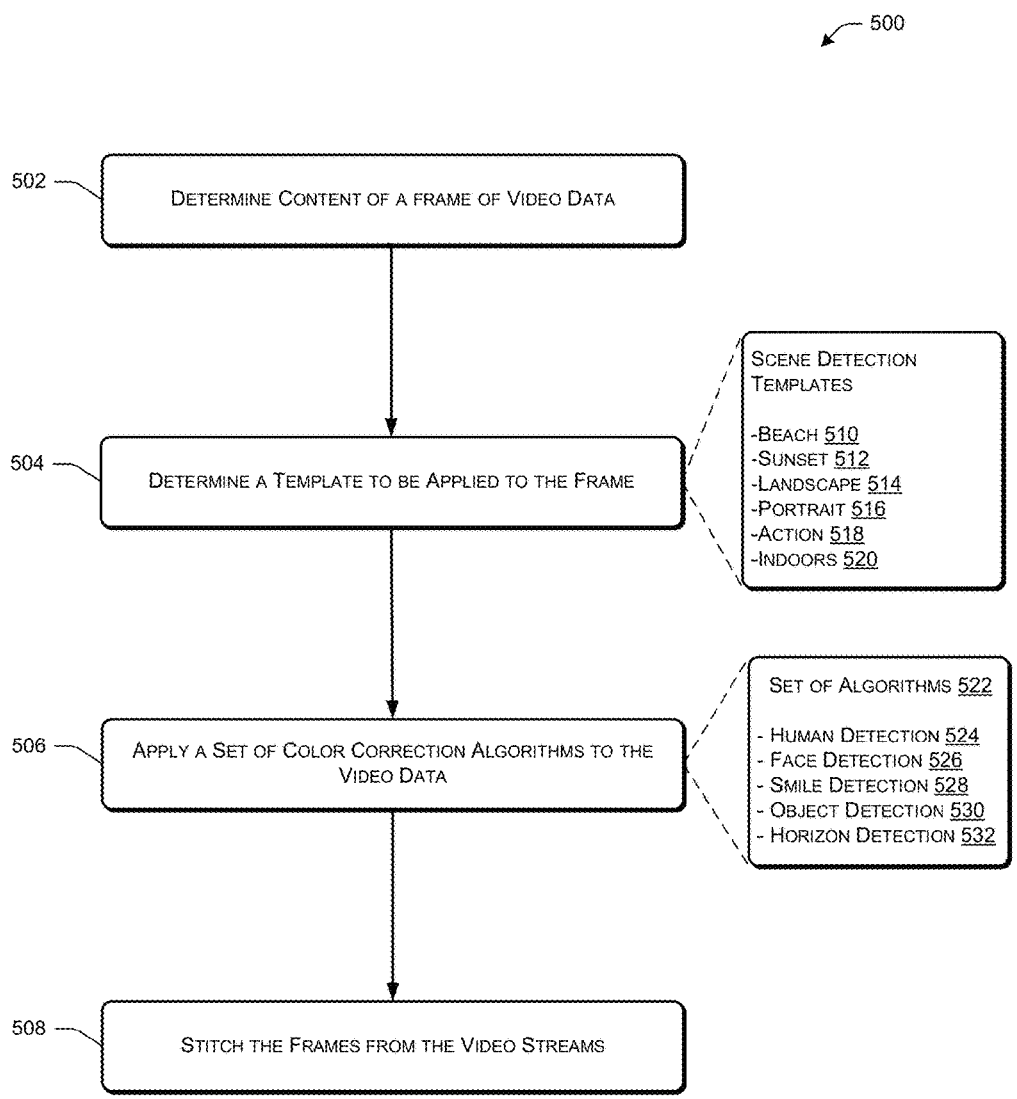
FIG. 5 is a flow diagram illustrating an example process of generating a panoramic video based upon video data captured by multiple cameras of a video capture device by applying a color adjusting template to the video data based upon the content of the video data.

FIG. 5 is a flow diagram illustrating an example process 500 of identifying a scene depicted within a frame and applying adjustments to the frames based on the depicted scene to adjust the color of the frames to more accurately reflect the real world. The following actions described with respect to FIG. 5 may be performed by the video capture device 102 and/or the remote computing resource(s) 108, as illustrated in, and described with respect to, FIGS. 1-3.

Block 502 illustrates determining the content of a frame of video data captured by multiple cameras of a video capture device. As set forth above, multiple cameras 114 of the video capture device 102 may simultaneously capture video data 120 of an environment surrounding the video capture device 102.

Block 504 illustrates determining a template to be applied to the frame. The detected scene can either be performed by the video capture device 102 and used to adjust the camera 114 settings for subsequent video streams, or can be used by the remote computing resources 108 to adjust the video data 120 that has already been captured. In either event, a scene detection algorithm can be executed to determine the type of scene being captured by the video capture device 102. Some examples of scenes may include a beach scene 510, a sunset 512, a landscape 514, a portrait 516, action such as a sporting event 518, and in indoor scene 520. Of course, multiple scenes may be simultaneously detected, such as a portrait scene 516 occurring indoors 520.

Block 506 illustrates applying a set of color correction algorithms to the video data. The algorithms used to adjust the frames are preferably dependent, at least in part, on the detected scene. For example, video data 120 corresponding to a landscape scene 514 may be improved by increasing the contrast, increasing the color saturation, and/or adjusting the white balance of the frames of video data 120. Appropriate algorithms can be applied to the video data 120 based at least in part on the detected scene. Of course, the appropriate algorithms can be applied globally to all of the video data 120 captured by the video capture device 102. Alternatively, the scene detection can be performed for each video stream and the adjustments can be made separately to the frames of each video stream separately before the video streams are stitched together to form a panoramic video 132.

Additional algorithms can be applied to the video data 120 based upon the detected scene. For instance, as a non-limiting example, the set of algorithms 522 may include a human detection 524 algorithm that detects the presence of people within the frames of the video data 120, face detection 526 algorithms that detect and/or identify faces of individuals, smile detection 528 algorithms that determine whether individuals are smiling, object detection 530 algorithms that detect and/or identify objects depicted in the frames of stitched video data, and/or horizon detection 5321 algorithms that determine a horizon within the frames of the video data 120.

Block 508 illustrates stitching the frames from the video streams to create a panoramic video 132. As described above, the frames are preferably blended and/or smoothed as they are combined to account for any color differences or artifacts between frames that are stitched together. The frames may be stitched together 508 prior to determining the template to be applied to the frame 504, or may be stitched together as a final step. Additionally, some of the algorithms may be applied to the frames prior to stitching, while others may be applied after the frames are stitched together. For example, the horizon detection 534 algorithm may be applied to each frame before the frames are stitched together. In this instance, the frames may be adjusted to level the horizon in each frame, and then the frames may be stitched together to create the panoramic video 132 with a substantially level horizon.

Figure 6:
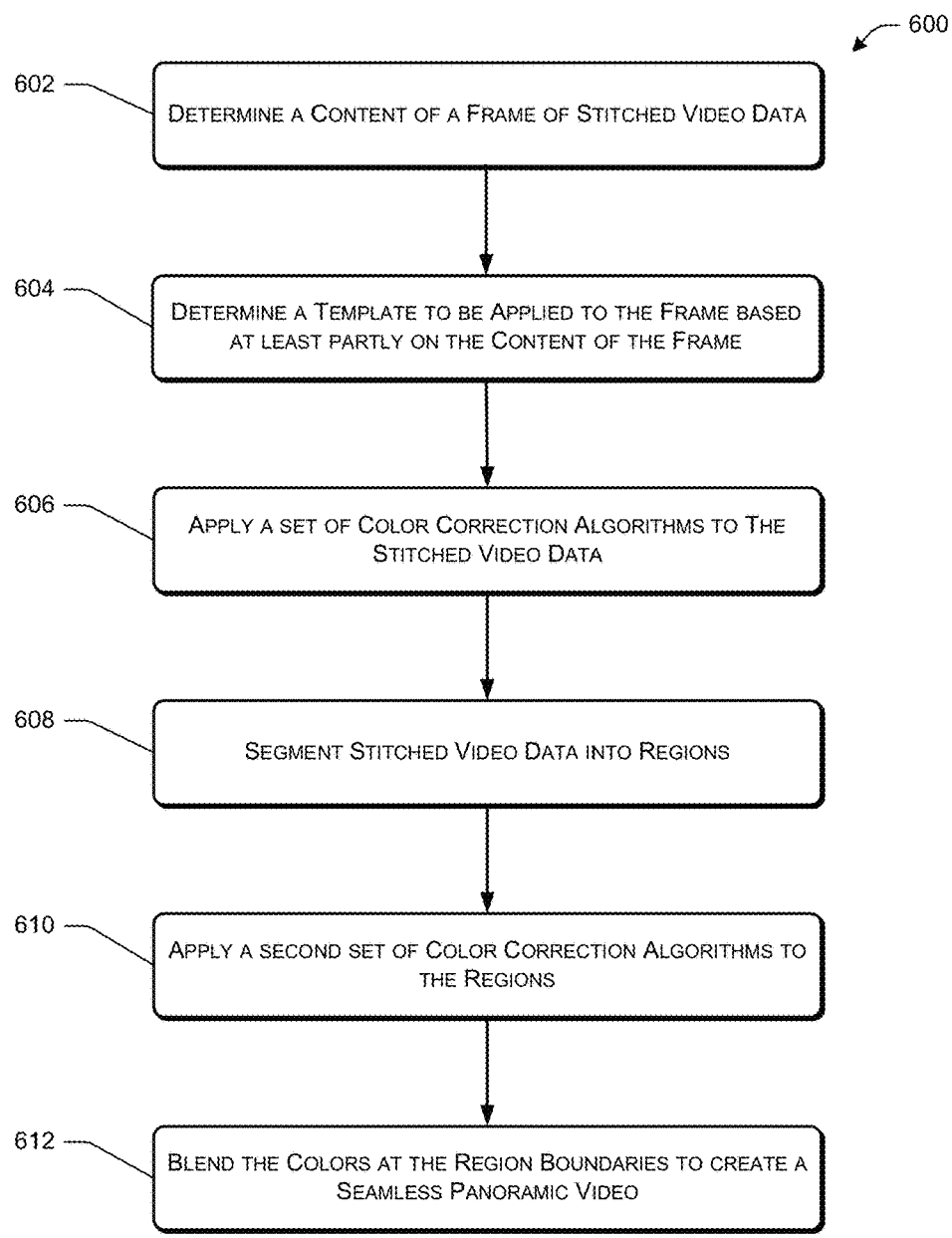
FIG. 6 is a flow diagram illustrating an example process of applying a color adjustment algorithm to stitched video data.

FIG. 6 is a flow diagram illustrating an example process 600 of generating a panoramic video from stitched video data 124 by segmenting the stitching video data 124 into regions, applying color correction algorithms to each region, and then blending the colors at the boundaries of the regions. The following actions described with respect to FIG. 6 may be performed by the video capture device 102 and/or the remote computing resource(s) 108, as illustrated in, and described with respect to, FIGS. 1-3.

Block 602 illustrates determining content of a frame of stitched video data 124. The remote computing resources 108 may also determine the content and/or composition of the selected frame, such as by determining that the selected frame depicts an indoor scene or an outdoor scene (e.g., a beach scene, a city landscape, etc.).

Block 604 illustrates determining a template to be applied to the frame based at least partly on the content of the frame. Based on the content and/or composition of the selected frame, the remote computing resources 108 may optionally select a template to be applied to the selected frame.

Block 606 illustrates applying a set of color correction algorithms to the stitched video data. That is, the remote computing resources 108 may run or execute algorithms that adjust or correct the color of the video data 120. As set forth above, the set of algorithms 608 may detect the type of scene captured in the stitched video data 124 and apply appropriate color adjusting algorithms based on the scene. For example, where the detected scene is a landscape scene, the color adjusting algorithms may increase the contrast of the frames of stitched video data 124. In some instances, the color adjustment algorithms may be applied to all frames of stitched video data 124 based upon the scene.

Block 608 illustrates segmenting the stitched video data 124 into regions. The regions may be vertical slices of the video data 120 at predetermined intervals or may be determined by other segmenting algorithms such as any of the many superpixel algorithms. As an example, in a video capture device 102 that has four cameras 114 that each capture video data 120 in which video frames have a resolution of 1080 pixels along the y-axis by 1920 pixels along the x-axis, the stitched video data 124 may be 1080 pixels along the y-axis and about 6912 pixels in the x-axis. There may be some overlap along the y-axis edges as the frames of video data 120 are stitched together. In this example, where there may be a 10% overlap in the frames of video data 120 at the edges of the frames of video data 120, the resulting panoramic video will be 1080 pixels in the y-direction and 6912 pixels in the x-direction. That is, the x-direction of the panoramic video will be 6912 pixels wide because (1920 pixels times 4 frames minus the 10% overlap between frames=6912 pixels). The regions may be vertical slices, that is, slices that are 1080 pixels in the y-direction, and a predetermined number of pixels in the x-direction, such as 144 pixels, which results in 12 equally sized vertical slices of video data 120. As is described above, the video data 120 is initially segmented in video streams corresponding with the individual camera 114 that captured the video stream. This additional process of segmenting the stitched video data 124 into regions is not based upon the edges between frames as they are initially captured. Segmenting the stitched video data 124 into regions allows for a finer adjustment of the exposure and color discrepancies that may be inherent between the video streams.

For instance, the stitched video data 124 may be segmented into regions based upon the determination of the primary subject. That is, once the primary subject has been determined, the stitched video data 124 may be segmented to isolate the primary subject in its own region, and the remaining stitched video data 124 may be further segmented to create multiple regions. Alternatively, the regions can be formed by vertically slicing the video data 124 at predetermined intervals. Finally, the regions may be formed by detecting objects, such as people, trees, buildings, etc., or may be a block of pixels.

Block 610 illustrates applying a second set of color correction algorithms to the regions. For example, the region including the primary subject can be adjusted to present the primary subject in an aesthetically pleasing manner, such as by adjusting the lighting, contrast, white balance, etc., based upon any of a number of suitable algorithms. More specifically, in the case of a portrait, the region including the primary subject (the primary region) may be adjusted to warm the colors by increasing the red levels of the frames of video data, slightly blurred to soften the features of the primary subject, and increase the contrast to lighten the highlights and darken the shadows. In other examples, one or more regions can have algorithms applied to them individually, such as a gray world assumption algorithm or a histogram equalization algorithm, to adjust the colors within each region. In some instances, each region may have a color correction algorithm applied to it individually.

As a non-limiting example, each region can have a gray world assumption algorithm applied to it. That is, based upon the assumption that the color value of pixels across an entire scene should average out to a neutral grey value, the colors can be adjusted to make this assumption true. That is, the pixels in a region can be analyzed and their color values determined. An algorithm can be run on the pixel color values to determine an average color value. The scene may then be either lightened or darkened to result in an average pixel color value of neutral grey.

The remaining regions of the video data 120 that do not contain the primary subject may be likewise adjusted similar to the region containing the primary subject. Alternatively, the regions may be adjusted based upon the scene being depicted in each region. For example, one region of the video data 120 may include a birthday cake with flaming candles while another region of the video data 120 may contain a person preparing to blow out the candles. Each of these regions may be adjusted based on the depicted scene, and every other region in the video data 120 may likewise be independently adjusted based upon the depicted scene. Moreover, secondary region(s) may be evaluated and adjusted based upon the scene being depicted within that secondary region, and the regions occurring between the primary region and the secondary region can be adjusted to provide a smooth visual transition between the primary region and the secondary region(s).

Continuing with the birthday example from above, a primary region and a secondary region may be identified and each have algorithms executed or run based upon the scene depicted in each region. The algorithms may be run on each region independently for the purpose of improving the video data 120 within that region. For example, the birthday cake and the person preparing to blow out the candles on the birthday cake may be in separate regions. The video data 120 within those separate regions can be independently adjusted to provide an aesthetically pleasing scene with each of the two regions, and then the regions occurring between the region including the birthday cake and the region including the person can be blended to provide a smooth color transition between the two regions of interest. For instance, the regions positioned in between the primary and secondary regions can be adjusted to provide a smooth transition in color, exposure, lighting, contrast, etc. between the primary region and the secondary region.

Alternatively, the system can evaluate the optimal adjustments that may be made to both the primary region and secondary regions, and then calculate a weighted average of those adjustments and apply this weighted average adjustment to a portion of the video data 120, or to all the video data 120.

Block 612 illustrates a process of blending the colors at the region boundaries to create a seamless, or near seamless, panoramic video. Once one or more regions have been adjusted, the regions can then be blended to form a panoramic video 132, as has been described. The panoramic video 132 can then be provided in any of a number of different ways. As non-limiting examples, the panoramic video 132 may be sent to a user device 106, stored on the remote computing resources 108 for access by the user over the network 112, delivered through email, or uploaded to a social networking or video content web site.

Figure 7:
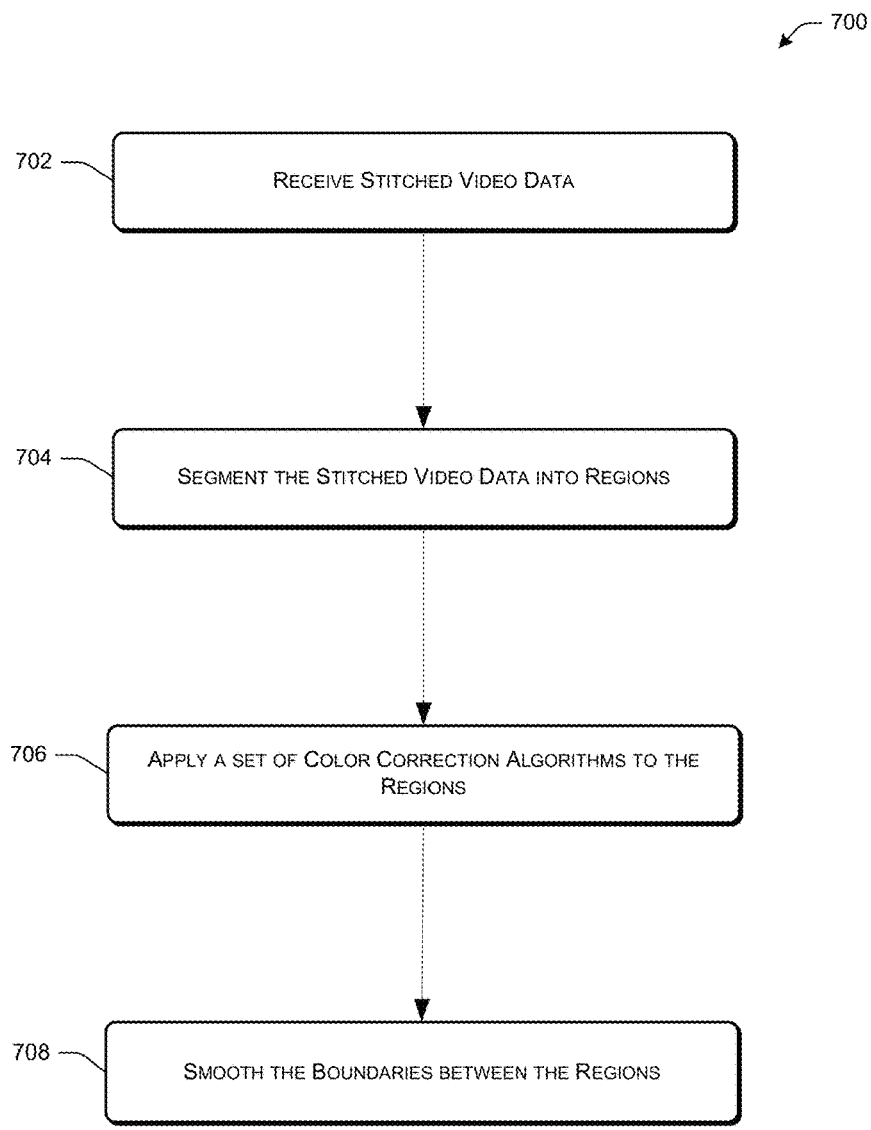
FIG. 7 is a flow diagram illustrating an example process of generating a panoramic video based upon video data captured by multiple cameras of a video capture device by segmenting the video data into regions, applying color correction algorithms to the regions, and smoothing the boundaries between the regions.

FIG. 7 is a flow diagram illustrating an example process 700 of generating a panoramic video 132 from stitched video data 124 by segmenting the stitched video data 124 into regions, adjusting the color of the regions, and blending the boundaries between the regions. The following actions described with respect to FIG. 7 may be performed by the video capture device 102 and/or the remote computing resource(s) 108, as illustrated in, and described with respect to, FIGS. 1-3.

At block 702, stitched video data 124 is received at the remote computing resources 108. The video data 120 may be stitched at the video capture device 102, or may be stitched at the remote computing resources 108.

In either event, at block 704, algorithms are run on the stitched video data 124 to segment the stitched video data 124 into regions. Several different algorithms may be used for this purpose, such as, for example, any of the superpixel algorithms or any suitable segmentation algorithm. Examples of suitable superpixel segmentation algorithms include, without limitation, contour relaxed superpixels, superpixels extracted via energy-driven sampling, topology preserved superpixels, superpixels via pseudo boolean optimization, compact superpixels, entropy rate superpixels, simple linear iterative clustering, Felzenswalb & Huttenlocher, quick shift, superpixels from normalized cuts, and turbopixels, to name a few. In some embodiments, the stitched video data 124 is segmented into columns for further processing.

At block 706, one or more color correction algorithms is applied to the regions. In some instances, each region has the algorithms applied to it separately. Some examples of desirable algorithms include, without limitation, gray world assumption algorithms and histogram equalization algorithms. It should be understood that any number of suitable algorithms can be run on the regions, or none at all.

At block 708, the boundaries of each region are smoothed to result in a seamless, nearly seamless, panoramic video. In some instances, the boundaries of each region are smoothed by applying a gradient blending algorithm to adjust the color of the pixels in proximity to the boundary between the regions. The result is a panoramic video 132 that exhibits relatively smooth color changes throughout the entire 360° of video.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   memory;
   one or more processors; and
   one or more computer-executable instructions stored in the memory and executable by the one or more processors to perform operations comprising:
   receiving from a video capture device, first video data captured by a first camera of the video capture device;
   receiving second video data captured by a second camera of the video capture device;
   assigning, using a color adjusting algorithm, color values to pixels associated with an object depicted in a first frame of the first video data, the assigning color values to pixels causing an increase in a contrast of the pixels associated with the object;
   generating, using a stitching algorithm, stitched video data by stitching together the first frame of the first video data and a second frame of the second video data each being associated with a common time stamp;
   determining a first color associated with a first pixel that is within the first frame of the stitched video data and that is in proximity to an adjacent region between the first frame and the second frame;
   determining a second color associated with a second pixel that is within the second frame of the stitched video data and that is in proximity to the adjacent region;
   determining that a difference between a first value representative of the first color and a second value representative of the second color exceeds a threshold amount; and
   blending, based at least in part on the determining that the difference between the first value and the second value exceeds the threshold amount and using a gradient blending algorithm, a transition between the first frame and the second frame at the adjacent region by assigning a new color value to the first pixel.

2. The system as recited in claim 1, wherein the operations further comprise:
   determining, using a segmenting algorithm, a first vertical slice region of the stitched video data and a second vertical slice region of the stitched video data; and assigning a second new color value, using a second gradient blending algorithm, to one or more pixels within the first vertical slice region to provide a gradual color transition between the first vertical slice region and the second vertical slice region.

3. The system as recited in claim 1, wherein the assigning the new color value to the first pixel further comprises determining that the difference between the first value representative of the first color and the second value representative of the second color is within a predetermined amount.

4. The system as recited in claim 1, wherein the operations further comprise:
  determining metadata associated with the first frame, the metadata including at least one of identification of the first camera that captured the first video data, the common time stamp associated with the first frame, sensor sensitivity settings of the first camera at a time in which the first frame was captured, white balance settings of the first camera at the time in which the first frame was captured, or exposure settings of the first camera at the time in which the first frame was captured; and
  wherein assigning color values to pixels associated with the object depicted in the first frame of the first video data is based at least partly on the metadata.

5. The system as recited in claim 1, wherein the operations further comprise:
  determining a first interest value associated with first content depicted in the first frame;
  determining that the first interest value is greater than a second interest value associated with second content depicted in the second frame; and
  assigning color values to pixels associated with the object to increase the contrast of the object depicted in the first frame based on the first interest value being greater than the second interest value.

6. A method comprising:
  receiving first image data;
  receiving second image data;
  determining an object depicted within the first image data;
  assigning, using a color adjusting algorithm, color values to pixels associated with the object depicted in the first image data, the assigning color values to pixels causing an increase in a contrast of the pixels associated with the object;
  determining a first region associated with the first image data;
  determining a second region associated with the second image data;
  determining a parameter depicted in the first region by changing a first color associated with a first pixel within the first region; and
  determining a second color associated with a second pixel within the first region, the second pixel being within a proximity from an edge boundary between the first region and the second region.

7. The method as recited in claim 6, further comprising:
  stitching together the first image data and the second image data by matching identical timestamps associated with the first image data and the second image data.

8. The method as recited in claim 6, further comprising determining that a difference between a first value representative of the first color associated with the first pixel and a second value representative of the second color associated with the second pixel exceeds a threshold value.

9. The method as recited in claim 8, wherein changing the first color associated with the first pixel further comprises determining that an average of the first value and the second value is within a predetermined amount of a predetermined value.

10. The method as recited in claim 6, further comprising:
  determining that the first image data is captured by a first camera of a video capture device;
  designating the first camera as a primary camera;
  determining that the second image data is captured by a second camera of the video capture device;
  designating the second camera as a secondary camera; and
  assigning a color value to the first pixel based at least in part on the first camera being designated as the primary camera.

11. The method as recited in claim 10, further comprising receiving, from at least one of the video capture device or a user device associated with a user, an indication that the first camera is to be designated as the primary camera.

12. The method as recited in claim 6, further comprising determining the first region associated with the first image data and the second region associated with the second image data by at least one of designating blocks of pixel values included in at least one of the first image data or the second image data, identifying vertical slices within at least one of the first image data or the second image data, or detecting objects in at least one of the first image data or the second image data.

13. The method as recited in claim 6, further comprising determining the second color associated with the second pixel within the first region using at least one of a gray world assumption algorithm or a histogram equalization algorithm.

14. The method as recited in claim 6, further comprising:
  determining a first interest value associated with first content depicted in the first region;
  determining that the first interest value is greater than a second interest value associated with second content depicted in the second region; and
  assigning a color value to the first pixel based at least in part on the first interest value being greater than the second interest value.

15. The method as recited in claim 6, further comprising:
  receiving third image data;
  receiving fourth image data; and
  stitching together the first image data, the second image data, the third image data, and the fourth image data.

16. A system comprising:
  memory;
  one or more processors; and
  one or more computer-executable instructions stored in the memory and executable by the one or more processors to perform operations comprising:
    determining stitched video data generated by stitching together first video data and second video data;
    assigning, using a color adjusting algorithm, color values to pixels associated with an object depicted in the first video data, the assigning color values to pixels causing an increase in a contrast of the pixels associated with the object;
    determining a first region associated with the stitched video data;
    determining a second region associated with the stitched video data;
    assigning a first color value to a first pixel corresponding to the object depicted in the first region;

executing a blending algorithm to determine a smooth color transition between the first region and the second region; and assigning, based at least in part on the executing the blending algorithm, a second color value to a second pixel corresponding to the object depicted in the second region, the first pixel and the second pixel being within a proximity from an edge boundary between the first region and the second region.

17. The system as recited in claim 16, wherein the operations further comprise determining the first region and the second region using a superpixel algorithm.

18. The system as recited in claim 16, wherein the operations further comprise determining that a difference between the color value of the first pixel and the color value of the second pixel exceeds a threshold value.

19. The system as recited in claim 16, wherein the operations further comprise:

receiving third video data and fourth video data; and determining the stitched video data by stitching together the first video data, the second video data, the third video data, and the fourth video data.

20. The system as recited in claim 16, wherein the operations further comprise:

detecting a scene depicted in the stitched video data;

selecting a template based at least in part upon the scene; and applying the template to the stitched video data to adjust at least one of contrast, brightness, hue saturation, or color temperature of the scene by adjusting a color value of one or more pixels associated with the stitched video data.

* * * * *